US012187061B2

(12) United States Patent
Taya et al.

(10) Patent No.: US 12,187,061 B2
(45) Date of Patent: Jan. 7, 2025

(54) THERMOSENSITIVE RECORDING MEDIUM AND IMAGE FORMING METHOD

(71) Applicant: CANON KABUSHIKI KAISHA, Tokyo (JP)

(72) Inventors: Akihiro Taya, Kanagawa (JP); Junji Ito, Kanagawa (JP); Yasuhiro Aichi, Tokyo (JP); Ayano Mashida, Kanagawa (JP); Masanobu Ootsuka, Tokyo (JP); Yutaka Yoshimasa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 380 days.

(21) Appl. No.: 17/408,571

(22) Filed: Aug. 23, 2021

(65) Prior Publication Data

US 2022/0024238 A1 Jan. 27, 2022

Related U.S. Application Data

(63) Continuation of application No. PCT/JP2020/007989, filed on Feb. 27, 2020.

(30) Foreign Application Priority Data

Feb. 28, 2019 (JP) ................................ 2019-035534

(51) Int. Cl.
*B41M 5/34* (2006.01)
*B41M 5/40* (2006.01)
*B41M 5/46* (2006.01)

(52) U.S. Cl.
CPC ................ *B41M 5/34* (2013.01); *B41M 5/40* (2013.01); *B41M 5/46* (2013.01)

(58) Field of Classification Search
CPC .......... B41M 2205/04; B41M 2205/38; B41M 2205/40; B41M 5/337; B41M 5/323;
(Continued)

(56) References Cited

U.S. PATENT DOCUMENTS 3,307,943 A * 3/1967 Heiart .................... G03F 7/027 430/254
4,484,204 A 11/1984 Yamamoto et al.
(Continued)

FOREIGN PATENT DOCUMENTS

CN 101104350 A 1/2008
CN 102152681 A 8/2011
(Continued)

OTHER PUBLICATIONS

Notice of Preliminary Rejection in Korean Application No. 10-2021-7029719 (Aug. 2022).
(Continued)

*Primary Examiner* — John Zimmermann
(74) *Attorney, Agent, or Firm* — Venable LLP

(57) ABSTRACT

A thermosensitive recording medium 100 includes a support 50, and a first thermosensitive coloring layer 10, a first intermediate layer 15, and a second thermosensitive coloring layer 20 disposed on the support 50 in descending order of distance from the support 50. The first thermosensitive coloring layer 10 and the second thermosensitive coloring layer 20 each contain an electron-donating dye precursor, an electron-accepting compound, a radical-polymerizable compound, and a photoradical polymerization initiator, and the first intermediate layer 15 contains a UV absorber.

18 Claims, 2 Drawing Sheets

(58) Field of Classification Search
CPC ...... B41M 5/345; B41M 5/287; B41M 5/405; B41M 7/0081; B41J 2/4753; G03F 7/002
See application file for complete search history.

(56) References Cited

U.S. PATENT DOCUMENTS

| | | | | |
|---|---|---|---|---|
| 5,091,280 | A | 2/1992 | Yamaguchi et al. | |
| 5,095,316 | A | 3/1992 | Hakkaku | |
| 5,202,304 | A * | 4/1993 | Iwakura | G03F 7/002 503/216 |
| 5,804,529 | A * | 9/1998 | Komatsu | B41M 5/42 427/152 |
| 5,948,727 | A * | 9/1999 | Hotta | B41M 5/305 503/201 |
| 5,985,791 | A * | 11/1999 | Okada | B41M 5/337 503/214 |
| 6,801,233 | B2 | 10/2004 | Bhatt et al. | |
| 6,906,735 | B2 | 6/2005 | Bhatt et al. | |
| 6,921,740 | B1 * | 7/2005 | Hizatate | B41M 5/3336 503/216 |
| 7,166,558 | B2 | 1/2007 | Bhatt et al. | |
| 7,388,686 | B2 | 6/2008 | Saquib et al. | |
| 7,635,660 | B2 | 12/2009 | Bhatt et al. | |
| 7,791,626 | B2 | 9/2010 | Busch et al. | |
| 7,808,674 | B2 | 10/2010 | Saquib et al. | |
| 7,830,405 | B2 | 11/2010 | Liu et al. | |
| 8,072,644 | B2 | 12/2011 | Saquib et al. | |
| 8,098,269 | B2 | 1/2012 | Busch et al. | |
| 8,164,609 | B2 | 4/2012 | Liu et al. | |
| 8,345,307 | B2 | 1/2013 | Saquib et al. | |
| 8,377,844 | B2 | 2/2013 | Day et al. | |
| 8,502,846 | B2 | 8/2013 | Liu et al. | |
| 8,546,300 | B2 | 10/2013 | Uchimura | |
| 8,610,750 | B2 | 12/2013 | Liu et al. | |
| 9,387,714 | B2 * | 7/2016 | Sugiyama | B41M 5/28 |
| 9,604,486 | B2 * | 3/2017 | Hofer | B41M 5/3335 |
| 2007/0004594 | A1 * | 1/2007 | Ohno | B41M 5/3375 503/201 |
| 2007/0032381 | A1 * | 2/2007 | Nagasaki | G03C 1/52 503/226 |
| 2008/0008963 | A1 | 1/2008 | Tamura et al. | |
| 2009/0165938 | A1 * | 7/2009 | Muro | B41M 5/345 156/230 |
| 2010/0197492 | A1 * | 8/2010 | Kawahara | B41M 5/426 503/201 |
| 2012/0075401 | A1 | 3/2012 | Busch et al. | |
| 2012/0083565 | A1 | 4/2012 | Day et al. | |
| 2013/0303670 | A1 | 11/2013 | Day et al. | |
| 2021/0380824 | A1 | 12/2021 | Yoshimasa et al. | |

FOREIGN PATENT DOCUMENTS

| | | | |
|---|---|---|---|
| EP | 0 992 363 | A1 | 4/2000 |
| EP | 3 101 072 | A1 | 12/2016 |
| JP | 58-177392 | A | 10/1983 |
| JP | 60-34893 | A | 2/1985 |
| JP | 3-43293 | A | 2/1991 |
| JP | 4-211252 | A | 8/1992 |
| JP | 4-255852 | A | 9/1992 |
| JP | 10-8651 | A | 1/1998 |
| JP | 10-086516 | A | 4/1998 |
| JP | 11-38607 | A | 2/1999 |
| JP | 11-038607 | A | 2/1999 |
| JP | 2003-255556 | A | 9/2003 |
| JP | 2003-312148 | A | 11/2003 |
| JP | 2008-030486 | A | 2/2008 |
| JP | 2016-078445 | A | 5/2016 |
| JP | 2018-035369 | A | 3/2018 |
| JP | 2018-039265 | A | 3/2018 |
| WO | 2020/175613 | A1 | 9/2020 |
| WO | 2020/175615 | A1 | 9/2020 |

OTHER PUBLICATIONS

International Preliminary Report on Patentability in International Application No. PCT/JP2020/007989 (Sep. 2021).

International Search Report in International Application No. PCT/JP2020/007989 (Apr. 2021).

Extended European Search Report in European Application No. 20762623.5 (Sep. 2022).

First Office Action in Chinese Application No. 202080017280.0 (Apr. 2022).

Notice of Reasons for Refusal in Japanese Application No. 2020-030537 (Jun. 2024).

* cited by examiner

THERMOSENSITIVE RECORDING MEDIUM AND IMAGE FORMING METHOD

CROSS-REFERENCE TO RELATED APPLICATIONS

This application is a Continuation of International Patent Application No. PCT/JP2020/007989, filed Feb. 27, 2020, which claims the benefit of Japanese Patent Application No. 2019-035534, filed Feb. 28, 2019, both of which are hereby incorporated by reference herein in their entirety.

BACKGROUND OF THE INVENTION

Field of the Invention

The present invention relates to a thermosensitive recording medium and an image forming method using the same.

Description of the Related Art

Heretofore, thermosensitive recording media utilizing a mechanism that causes a leuco dye to color via reaction with a color developer have been widely used. Thermosensitive recording media have been widely employed as recording media for facsimile, receipts, and other applications since they do not require consumable materials such as inks or toners and are relatively inexpensive.

Also, in recent years, there has been an increasing demand for thermosensitive recording media capable of recording colors other than black, and various color thermosensitive recording media have been proposed. For example, a thermosensitive recording medium and an image forming method using the same have been proposed in which a plurality of coloring layers are provided, the top coloring layer is heated to color and is then fixed, and thereafter heating and fixing treatments are performed on the other underlying coloring layers (Japanese Patent Application Laid-Open No. H03-043293). Moreover, an image forming method has been proposed in which the temperatures and heating times for causing color materials to color are controlled so as to cause only a particular layer to color and no fixing treatment is performed (Japanese Patent Application Laid-Open No. 2008-030486). Furthermore, a thermosensitive recording medium production method has been proposed which includes a step of irradiating a film made of a thermosensitive coloring composition containing an electron-donating dye precursor, an electron-accepting compound, an electron beam or UV curable compound, and an epoxy compound with an electron beam or the like to thereby form a thermosensitive coloring layer (Japanese Patent Application Laid-Open No. 2016-078445).

However, in the image forming method proposed in Japanese Patent Application Laid-Open No. H03-043293, UV decomposition of a diazonium salt is utilized for fixing. Thus, there are not many options for color materials, and it is difficult to employ color materials with better color development properties. Moreover, in the image forming method proposed in Japanese Patent Application Laid-Open No. 2008-030486, since no fixing treatment is performed, increasing the thermal energy to be applied in order to improve the color development property may cause a phenomenon in which an unintended color is developed, which is what is called "color turbidity".

Furthermore, with the thermosensitive recording medium proposed in Japanese Patent Application Laid-Open No. 2016-078445, a phenomenon in which coloring occurs unintendedly during storage before image formation, which is what is called "fogging", may occur. To suppress this fogging, Japanese Patent Application Laid-Open No. 2016-078445 proposes that a thermosensitive coloring composition applied onto a support be irradiated with an electron beam or UV ray to cure the thermosensitive coloring composition. However, using a thermosensitive recording medium having a thermosensitive recording layer formed by curing the thermosensitive coloring composition tends to cause problems such as that the color development property of an image to be formed decreases easily. Thus, an improvement has been desired.

It is therefore an object of the present invention to provide a thermosensitive recording medium that has two or more thermosensitive coloring layers but can still suppress the occurrence of color turbidity and form an image with a good color development property. Moreover, it is another object of the present invention to provide an image forming method using the above thermosensitive recording medium.

SUMMARY OF THE INVENTION

The above objects are achieved by the present invention below. Specifically, according to the present invention, a thermosensitive recording medium is provided. Here, the thermosensitive recording medium including a support and a first thermosensitive coloring layer, a first intermediate layer, and a second thermosensitive coloring layer disposed on the support in descending order of distance from the support in which the first thermosensitive coloring layer and the second thermosensitive coloring layer each contain an electron-donating dye precursor, an electron-accepting compound, a radical-polymerizable compound, and a photoradical polymerization initiator, and the first intermediate layer contains a UV absorber.

Further features of the present invention will become apparent from the following description of exemplary embodiments with reference to the attached drawings.

DESCRIPTION OF THE EMBODIMENTS

Thermosensitive Recording Medium

Figure 1:
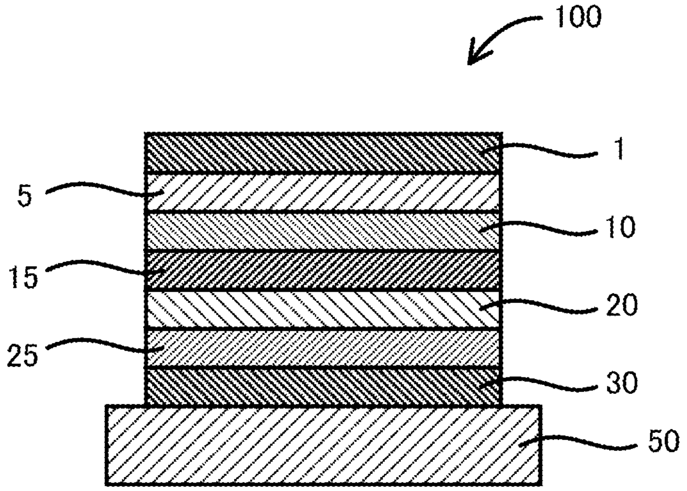
FIG. 1 is a cross-sectional view illustrating one embodiment of a thermosensitive recording medium of the present invention.

Hereinafter, details of the present invention will be described based on a preferred embodiment. However, the present invention is not limited to the following embodiment. The thermosensitive recording medium of the present invention is a thermosensitive recording medium including a support and a first thermosensitive coloring layer, a first intermediate layer, and a second thermosensitive coloring layer disposed on the support in descending order of distance from the support. The first thermosensitive coloring layer and the second thermosensitive coloring layer each contain an electron-donating dye precursor, an electron-accepting compound, a radical-polymerizable compound, and a photoradical polymerization initiator. Also, the first intermediate layer contains a UV absorber.

When heat is applied to the first thermosensitive coloring layer and the second thermosensitive coloring layer, the electron-donating dye precursors and the electron-accepting compounds in these layers react with each other, so that colors are developed. Then, when the colored thermosensitive recording medium is irradiated with UV rays, the photoradical polymerization initiators in the first thermosensitive coloring layer and the second thermosensitive coloring layer absorb the UV rays and the radical-polymerizable compounds polymerize, so that these thermosensitive coloring layers cure and their color development properties are maintained. Incidentally, a UV absorber is contained in the first intermediate layer. The curing timings for the first thermosensitive coloring layer and the second thermosensitive coloring layer can be controlled by adjusting the absorption wavelength range of the UV absorber in the first intermediate layer and the absorption wavelength range of the photoradical polymerization initiator in the second thermosensitive coloring layer. That is, the curing timings for the first thermosensitive coloring layer and the second thermosensitive coloring layer can be controlled in accordance with the coloring of the first thermosensitive coloring layer and the second thermosensitive coloring layer. This enables formation of an image with a good color development property while suppressing the occurrence of color turbidity.

Thermosensitive Coloring Layers

The first thermosensitive coloring layer and the second thermosensitive coloring layer each contain an electron-donating dye precursor, an electron-accepting compound, a radical-polymerizable compound, and a photoradical polymerization initiator. Hereinafter, when the term “the thermosensitive coloring layer” is simply used, it means all thermosensitive coloring layers. In the thermosensitive coloring layer, the electron-donating dye precursor and the electron-accepting compound are preferably present in a dispersed manner in a binder without contacting each other. For example, the electron-donating dye precursor and the electron-accepting compound may each be encapsulated, that is, enclosed, by the radical-polymerizable compound and the photoradical polymerization initiator. Further, the radical-polymerizable compound and the photoradical polymerization initiator may be used as a binder. The electron-donating dye precursor and the electron-accepting compound are each preferably dispersed in a particle size of 10 nm or more and 1,000 nm or less in the binder, and more preferably dispersed in a particle size of 50 nm or more and 300 nm or less in the binder. When the particle size is 10 nm or more or even 50 nm or more, it is possible to suppress the occurrence of fogging due to storage. Also, when the particle size is 1,000 nm or less or even 300 nm or less, unnecessary optical scatter in the thermosensitive coloring layer is reduced. Accordingly, the image density can be enhanced.

The first thermosensitive coloring layer and the second thermosensitive coloring layer forming the thermosensitive recording medium are disposed in descending order of distance from the support, so that they appear in order of the first thermosensitive coloring layer and the second thermosensitive coloring layer. Incidentally, it is preferable to further include a third thermosensitive coloring layer disposed between the second thermosensitive coloring layer and the support. Specifically, in the thermosensitive recording medium in this case, the first thermosensitive coloring layer, the second thermosensitive coloring layer, and the third thermosensitive coloring layer are disposed in descending order of distance from the support, so that they appear in order of the first thermosensitive coloring layer, the second thermosensitive coloring layer, and the third thermosensitive coloring layer. It is preferable that the third thermosensitive coloring layer contain an electron-donating dye precursor and an electron-accepting compound. It is also preferable that the third thermosensitive coloring layer further contain a radical-polymerizable compound and a photoradical polymerization initiator.

Electron-Donating Dye Precursor

The thermosensitive coloring layer contains an electron-donating dye precursor (leuco dye). The electron-donating dye precursor is usually colorless or light-colored. The electron-donating dye precursor has a property of coloring by donating an electron or accepting a proton such as an acid. Specific examples of the electron-donating dye precursor are listed below.

Examples of an electron-donating dye precursor that colors in a red or vermilion-based tone may include 3,6-bis(diethylamino)fluoran-γ-anilinolactam, 3,6-bis(diethylamino)fluoran-γ-(p-nitro)anilinolactam, 3,6-bis(diethylamino)fluoran-γ-(o-chloro)anilinolactam, 3-dimethylamino-7-bromofluoran, 3-diethylaminofluoran, 3-diethylamino-6-methylfluoran, 3-diethylamino-7-methylfluoran, 3-diethylamino-7-chlorofluoran, 3-diethylamino-7-bromofluoran, 3-diethylamino-7,8-benzofluoran, 3-diethylamino-6,8-dimethylfluoran, 3-diethylamino-6-methyl-7-chlorofluoran, 3-diethylamino-7-tert-butylfluoran, 3-(N-ethyl-N-tolylamino)-7-ethylfluoran, 3-(N-ethyl-N-isobutylamino)-6-methyl-7-chlorofluoran, and the like.

Examples of the electron-donating dye precursor that colors in a red or vermilion-based tone may further include 3-cyclohexylamino-6-chlorofluoran, 3-di(n-butyl)amino-6-methyl-7-bromofluoran, 3-di(n-butyl)amino-7,8-benzofluoran, 3-tolylamino-7-methylfluoran, 3-tolylamino-7-ethylfluoran, 2-(N-acetylanilino)-3-methyl-6-di(n-butyl)aminofluoran, 2-(N-propionylanilino)-3-methyl-6-di(n-butyl)aminofluoran, 2-(N-benzoylanilino)-3-methyl-6-di(n-butyl)aminofluoran, 2-(N-carbobutoxyanilino)-3-methyl-6-di(n-butyl)aminofluoran, 2-(N-formylanilino)-3-methyl-6-di(n-butyl)aminofluoran, 2-(N-benzylanilino)-3-methyl-6-di(n-butyl)aminofluoran, 2-(N-allylanilino)-3-methyl-6-di(n-butyl)aminofluoran, 2-(N-methylanilino)-3-methyl-6-di(n-butyl)aminofluoran, 3-diethylamino-7-phenoxyfluoran, 2-methyl-6-(N-p-tolyl-N-ethylamino)-fluoran, and the like.

Examples of an electron-donating dye precursor that colors in a magenta-based tone may include 3,3-bis(1-ethyl-2-methylindole-3-yl)phthalide, 3,3-bis(1-n-octyl-2-methylindole-3-yl)phthalide, 7-(N-ethyl-N-isoamylamino)-3-methyl-1-phenylspiro[(1,4-dihydrochromeno[2,3-c]pyrazole)-4,3'-phthalide], 7-(N-ethyl-N-isoamylamino)-3-methyl-1-p-methylphenylspiro[(1,4-dihydrochromeno[2,3-c]pyrazole)-4,3'-phthalide], 7-(N-ethyl-N-n-hexylamino)-3-methyl-1-phenylspiro[(1,4-dihydrochromeno[2,3-c]pyrazole)-4,3'-phthalide], and the like.

Examples of the electron-donating dye precursor that colors in a magenta-based tone may further include 3-(N-ethyl-N-isoamylamino)-7,8-benzofluoran, 3,3-bis(1-n-butyl-2-methylindole-3-yl)phthalide, 3-(N-ethyl-N-isoamylamino)-7-phenoxyfluoran, and the like.

As the electron-donating dye precursor that colors in a red, vermilion, or magenta-based tone, it is preferable to use at least one selected from the group consisting of 3-diethylamino-7-chlorofluoran, 3-diethylamino-6,8-dimethylfluoran, 3-(N-ethyl-N-isoamylamino)-7,8-benzofluoran, 2-methyl-6-(N-p-tolyl-N-ethylamino)-fluoran, 3-di(n-butyl)amino-6-methyl-7-bromofluoran, and 3,3-bis(1-n-butyl-2-methylindole-3-yl)phthalide.

Examples of an electron-donating dye precursor that colors in a blue-based tone may include 3,3-bis(p-dimethylaminophenyl)-6-dimethylaminophthalide, 3-(4-diethylamino-2-methylphenyl)-3-(4-dimethylaminophenyl)-6-dimethylaminophthalide, 3-(4-diethylamino-2-ethoxyphenyl)-3-(1-ethyl-2-methylindole-3-yl)-4-azaphthalide, 3-(1-ethyl-2-methylindole-3-yl)-3-(4-diethylaminophenyl)phthalide, 3-(1-ethyl-2-methylindole-3-yl)-3-(2-methyl-4-diethylaminophenyl)-4-azaphthalide, 3-(1-ethyl-2-methylindole-3-yl)-3-(2-ethoxy-4-diethylaminophenyl)-4-azaphthalide, 3-(1-ethyl-2-methylindole-3-yl)-3-(2-n-hexyloxy-4-diethylaminophenyl)-4-azaphthalide, 3-diphenylamino-6-diphenylaminofluoran, and the like.

Examples of an electron-donating dye precursor that colors in a cyan-based tone may include 3-(1-ethyl-2-methylindole-3-yl)-3-(4-diethylamino-2-methylphenyl)-4-azaphthalide, 3-[1,1-bis(p-diethylaminophenyl)ethylene-2-yl]-6-dimethylaminophthalide, 3,3-bis(4-diethylamino-2-ethoxyphenyl)-4-azaphthalide, 3,3'-bis(4-diethylamino-2-ethoxyphenyl)-4-azaphthalide, and the like.

As the electron-donating dye precursor that colors in a blue or cyan-based tone, it is preferable to use at least one selected from the group consisting of 3,3-bis(p-dimethylaminophenyl)-6-dimethylaminophthalide, 3-(4-diethylamino-2-methylphenyl)-3-(4-dimethylaminophenyl)-6-dimethylaminophthalide, 3-(4-diethylamino-2-ethoxyphenyl)-3-(1-ethyl-2-methylindole-3-yl)-4-azaphthalide, 3-(1-ethyl-2-methylindole-3-yl)-3-(4-diethylamino-2-methylphenyl)-4-azaphthalide, 3-(1-ethyl-2-methylindole-3-yl)-3-(2-n-hexyloxy-4-diethylaminophenyl)-4-azaphthalide, 3-[1,1-bis(p-diethylaminophenyl)ethylene-2-yl]-6-dimethylaminophthalide, and 3,3'-bis(4-diethylamino-2-ethoxyphenyl)-4-azaphthalide.

Examples of an electron-donating dye precursor that colors in a yellow-based tone may include 4-[2-[2-(butoxy)phenyl]-6-phenyl-4-pyridinyl]-N,N-dimethylbenzeneamine, 4-[2-[2-(octyloxy)phenyl]-6-phenyl-4-pyridinyl]-N,N-dimethylbenzeneamine, 4-[2-[2-(ethoxy)phenyl]-6-phenyl-4-pyridinyl]-N,N-dimethylbenzeneamine, 4-[2,6-bis(2-ethoxyphenyl)-4-pyridinyl]-N,N-dimethylbenzeneamine, 4-(2,6-diphenyl-4-pyridinyl)-N,N-dimethylbenzeneamine, 4-[2,6-bis(2-butoxyphenyl)-4-pyridinyl]-N,N-dimethylbenzeneamine, 4-[2,6-bis(2-octyloxyphenyl)-4-pyridinyl]-N,N-dimethylbenzeneamine, 4-[2-[2-(hexyloxy)phenyl]-6-phenyl-4-pyridinyl]-N,N-dimethylbenzeneamine, 4-[2,6-bis(2-hexyloxyphenyl)-4-pyridinyl]-N,N-dimethylbenzeneamine, 3,6-dimethoxyfluoran, 1-(4-n-dodecyloxy-3-methoxyphenyl)-2-(2-quinolyl)ethylene, and the like.

As the electron-donating dye precursor that colors in a yellow-based tone, it is preferable to use at least one selected from the group consisting of 4-[2-[2-(octyloxy)phenyl]-6-phenyl-4-pyridinyl]-N,N-dimethylbenzeneamine, 3,6-dimethoxyfluoran, and 1-(4-n-dodecyloxy-3-methoxyphenyl)-2-(2-quinolyl)ethylene.

Examples of an electron-donating dye precursor that colors in a green-based tone may include 3-(N-ethyl-N-n-hexylamino)-7-anilinofluoran, 3-diethylamino-7-dibenzylaminofluoran, 3-pyrrolidino-7-dibenzylaminofluoran, 3,3-bis(4-diethylamino-2-ethoxyphenyl)-4-azaphthalide, 3-(N-ethyl-N-p-tolylamino)-7-(N-phenyl-N-methylamino)fluoran, 3-[p-(p-anilinoanilino)anilino]-6-methyl-7-chlorofluoran, 3,6-bis(dimethylamino)fluorene-9-spiro-3'-(6'-dimethylamino)phthalide, and the like.

As the electron-donating dye precursor that colors in a green-based tone, it is preferable to use at least one selected from the group consisting of 3-diethylamino-7-dibenzylaminofluoran and 3-pyrrolidino-7-dibenzylaminofluoran.

Examples of an electron-donating dye precursor that colors in a black-based tone may include 3-pyrrolidino-6-methyl-7-anilinofluoran, 3-diethylamino-7-(m-trifluoromethylanilino)fluoran, 3-diethylamino-6-methyl-7-(m-methylanilino)fluoran, 3-(N-isoamyl-N-ethylamino)-7-(o-chloroanilino)fluoran, 3-(N-ethyl-p-toluidino)-6-methyl-7-anilinofluoran, 3-(N-ethyl-N-2-tetrahydrofurfurylamino)-6-methyl-7-anilinofluoran, 3-diethylamino-6-chloro-7-anilinofluoran, 3-di(n-butyl)amino-6-methyl-7-anilinofluoran, 3-di(n-amyl)amino-6-methyl-7-anilinofluoran, 3-(N-isoamyl-N-ethylamino)-6-methyl-7-anilinofluoran, 3-(N-n-hexyl-N-ethylamino)-6-methyl-7-anilinofluoran, 3-[N-(3-ethoxypropyl)-N-ethylamino)-6-methyl-7-anilinofluoran, 3-[N-(3-ethoxypropyl)-N-methylamino)-6-methyl-7-anilinofluoran, 3-diethylamino-7-(2-chloroanilino)fluoran, 3-di(n-butyl)amino-7-(2-chloroanilino)fluoran, 3-diethylamino-6-methyl-7-anilinofluoran, 3-diethylamino-6-methyl-7-(2,6-dimethylanilino)fluoran, 3-diethylamino-6-methyl-7-(2,4-dimethylanilino)fluoran, 2,4-dimethyl-6-(4-dimethylaminoanilino)fluoran, 3-(N-cyclohexyl-N-methylamino)-6-methyl-7-anilinofluoran, and the like.

As the electron-donating dye precursor that colors in a black-based tone, it is preferable to use at least one selected from the group consisting of 3-di(n-butyl)amino-6-methyl-7-anilinofluoran, 3-di(n-amyl)amino-6-methyl-7-anilinofluoran, 3-diethylamino-6-methyl-7-(2,6-dimethylanilino)fluoran, 3-diethylamino-6-methyl-7-(2,4-dimethylanilino)fluoran, and 2,4-dimethyl-6-(4-dimethylaminoanilino)fluoran, which have relatively good light fastness.

Examples of electron-donating dye precursors that absorb a near-infrared range may include 3,3-bis[1,1-bis(4-pyrrolidinophenyl)ethylene-2-yl]-4,5,6,7-tetrabromophthalide, 3,3-bis[1-(4-methoxyphenyl)-1-(4-dimethylaminophenyl)ethylene-2-yl]-4,5,6,7-tetrachlorophthalide, 3,3-bis[1-(4-methoxyphenyl)-1-(4-pyrrolidinophenyl)ethylene-2-yl]-4,5,6,7-tetrachlorophthalide, 3-[p-(p-anilinoanilino)anilino]-6-methyl-7-chlorofluoran, 3-[p-(p-dimethylaminoanilino)anilino]-6-methyl-7-chlorofluoran, 3,6-bis(dimethylamino)fluorene-9-spiro-3'-(6'-dimethylamino)phthalide, bis(p-dimethylaminostyryl)-p-tolylsulfonylmethane, 3-[p-(p-dimethylaminoanilino)anilino]-6-methylfluoran, 3-di(n-pentyl)amino-6,8,8-trimethyl-8,9-dihydro-(3,2,e)pyridofluoran, 3-di(n-butyl)amino-6,8,8-trimethyl-8,9-dihydro-(3,2,e)pyridofluoran, 3-(p-n-butylaminoanilino)-6-methyl-7-chlorofluoran, 2-mesidino-8-diethylamino-benz[c]fluoran, and the like.

In the thermosensitive coloring layer, the electron-donating dye precursor is preferably contained in a state of being enclosed in particles made of the radical-polymerizable compound and the photoradical polymerization initiator. The content of the electron-donating dye precursor in the thermosensitive coloring layer is preferably 0.01 $g/m^2$ or more and 2.00 $g/m^2$ or less since, in this way, an image with a more sufficient optical density can be formed.

Electron-Accepting Compound

The thermosensitive coloring layer contains an electron-accepting compound (color developer) having a property of causing the electron-donating dye precursor to color by contacting it. As the electron-accepting compound, it is preferable to use a compound having a property of liquefying or dissolving with a rise in temperature. Examples of the electron-accepting compound may include organic acidic substances such as phenol compounds, aromatic carboxylic acids, and polyvalent metal salts of these compounds, and the like.

Examples of the electron-accepting compound may include 4-tert-butylphenol, 4-acetylphenol, 4-tert-octylphenol, 4,4'-sec-butylidenediphenol, 4-phenylphenol, 4,4'-dihydroxydiphenylmethane, 4,4'-isopropylidenediphenol, 4,4'-dihydroxydiphenyl ether, 4,4'-cyclohexylidenediphenol, 1,1-bis(4-hydroxyphenyl)ethane, 1,1-bis(4-hydroxyphenyl)-1-phenylethane, 4,4'-dihydroxydiphenyl sulfide, 4,4'-thiobis(3-methyl-6-tert-butylphenol), 4,4'-dihydroxydiphenyl sulfone, 2,4'-dihydroxydiphenyl sulfone, 4-hydroxy-4'-isopropoxydiphenyl sulfone, 4-hydroxy-4'-n-propoxydiphenyl sulfone, 4-hydroxy-4'-allyloxydiphenyl sulfone, bis(3-allyl-4-hydroxyphenyl)sulfone, 4,4'-bis[(4-methyl-3-phenoxycarbonylaminophenyl)ureido]diphenyl sulfone, 4-[4'-(1'-methylethyloxy)phenyl]sulfonylphenol, N-(p-toluenesulfonyl)-N'-(3-p-toluenesulfonyloxyphenyl)urea, N-p-tolylsulfonyl-p-butoxycarbonylphenylurea, N-(p-toluenesulfonyl)-N'-phenylurea, 4,4'-bis(3-tosylureido)diphenylmethane, and the like.

The electron-accepting compound may further include organic acidic substances such as: phenol compounds such as 4-hydroxybenzophenone, dimethyl 4-hydroxyphthalate, methyl 4-hydroxybenzoate, propyl 4-hydroxybenzoate, sec-butyl 4-hydroxybenzoate, phenyl 4-hydroxybenzoate, benzyl 4-hydroxybenzoate, tolyl 4-hydroxybenzoate, chlorophenyl 4-hydroxybenzoate, and 4,4'-dihydroxydiphenyl ether; aromatic carboxylic acids such as benzoic acid, p-tert-butylbenzoic acid, trichlorobenzoic acid, terephthalic acid, salicylic acid, 3-tert-butylsalicylic acid, 3-isopropylsalicylic acid, 3-benzylsalicylic acid, 3,5-(α-methylbenzyl)salicylic acid, and 3,5-di-tert-butylsalicylic acid; and salts of these compounds and polyvalent metals such as zinc, magnesium, aluminum, and calcium.

In the thermosensitive coloring layer, the electron-accepting compound is preferably contained in a state of being enclosed in particles made of the radical-polymerizable compound and the photoradical polymerization initiator. The content of the electron-accepting compound in the thermosensitive coloring layer is preferably 0.01 $g/m^2$ or more and 10.00 $g/m^2$ or less since, in this way, an image with a more sufficient optical density can be formed. Also, the content of the electron-accepting compound in the thermosensitive coloring layer is preferably 100% by mass or more and 1,000% by mass or less relative to the electron-donating dye precursor. By setting the content of the electron-accepting compound at 100% by mass or more relative to the electron-donating dye precursor, the color development property of an image can be further improved. On the other hand, by setting the content of the electron-accepting compound at 1,000% by mass or less relative to the electron-donating dye precursor, the decrease in texture due to an increase in film thickness can be suppressed while the film strength can also be improved.

Radical-Polymerizable Compound

The thermosensitive coloring layer contains a radical-polymerizable compound. The radical-polymerizable compound is preferably a compound that is solid at 25° C. In other words, the melting point of a radical-polymerizable compound that is solid at 25° C. is above 25° C.

The melting point of the radical-polymerizable compound is preferably 60° C. or more. Using that radical-polymerizable compound with a melting point of 60° C. or more can suppress the occurrence of fogging due to storage. Also, the glass transition temperature of the radical-polymerizable compound is preferably 40° C. or more. Using that radical-polymerizable compound with a glass transition temperature of 40° C. or more can suppress fogging due to storage. The melting point and glass transition temperature of the radical-polymerizable compound can both be measured by differential scanning calorimetry (DSC). The scanning speed can be 10° C./min, for example.

Examples of the radical-polymerizable compound that is solid at 25° C. may include radical-polymerizable monomers, radical-polymerizable oligomers, radical-polymerizable polymers, and the like.

Examples of the radical-polymerizable monomers that are solid at 25° C. may include stearyl acrylate, behenyl acrylate, cyclohexanedimethanol diacrylate, bisphenol A diacrylate, ethoxylated bisphenol A diacrylate, propoxylated bisphenol A diacrylate, hydrogenated bisphenol A diacrylate, ethoxylated hydrogenated bisphenol A diacrylate, propoxylated hydrogenated bisphenol A diacrylate, tris(2-hydroxyethyl)isocyanurate triacrylate, and the like.

Examples of the radical-polymerizable oligomers that are solid at 25° C. may include oligomers such as urethane oligomers, epoxy oligomers, and polyester oligomers with an acrylate group bonded thereto, and the like. An appropriate linking group may be interposed between the above oligomers and the acrylate group.

Examples of the radical-polymerizable polymers that are solid at 25° C. may include polymers such as acrylic polymers, urethane polymers, epoxy polymers, and polyester polymers with an acrylate group bonded thereto, and the like. An appropriate linking group may be interposed between the above polymers and the acrylate group.

Two or more kinds of radical-polymerizable compounds may be used in combination. In the case of using two or more kinds of radical-polymerizable compounds, the melting point of the radical-polymerizable compounds means the melting point of a mixture of the radical-polymerizable compounds. Also, in the case of using two or more kinds of radical-polymerizable compounds, the glass transition temperature of the radical-polymerizable compounds means the glass transition temperature of a mixture of the radical-polymerizable compounds.

The molecular weight of the radical-polymerizable compound is preferably 1,000 or more and more preferably 10,000 or more. By using that radical-polymerizable compound with a molecular weight of 1,000 or more, the color development property of an image is maintained for a longer period of time. Accordingly, the storage stability of the image can be further enhanced. Also, by using that radical-polymerizable compound with a molecular weight of 1,000 or more, the storage stability of an image can be enhanced even when the amount of radicals to be generated is reduced by, for example, reducing the amount of UV irradiation. Note that it is preferable to reduce the amount of UV irradiation since, in this way, the image formation speed (printing speed) can be improved.

The molecular weight of the radical-polymerizable compound is preferably 1,000,000 or less from a viewpoint of the handleability of a coating liquid for forming the thermosensitive coloring layer and the like. The molecular weight of the radical-polymerizable compound herein means a molecular weight in the case of a radical-polymerizable monomer and means a weight average molecular weight (Mw) in the case of a radical-polymerizable oligomer and radical-polymerizable polymer.

The weight average molecular weight of the radical-polymerizable compound is a value in terms of polystyrene measured by size exclusion chromatography (SEC). The weight average molecular weight measurement by SEC can be carried out through the procedure described below. Firstly, a sample is added to the eluent below such that the concentration will be 1.0% by mass, and the mixture is left at rest at room temperature for 24 hours to thereby prepare a specimen. Thereafter, the specimen is filtered through a solvent-resistant membrane filter with a pore size of 0.2 μm and then separated under the conditions described below. In this way, the weight average molecular weight of the radical-polymerizable compound can be measured.

Apparatus: high-performance GPC apparatus "HLC-8220GPC" (manufactured by Tosoh Corporation)

Column: MIXED-C×2

Eluent: THE (with sodium trifluoroacetate added thereto)

Flow rate: 1.0 mL/min

Oven temperature: 40° C.

Amount of specimen injected: 0.025 mL

A molecular weight calibration curve generated using standard polystyrene resins (TSK Standard Polystyrene F-850, F-450, F-288, F-128, F-80, F-40, F-20, F-10, F-4, F-2, F-1, A-5000, A-2500, A-1000, and A-500, manufactured by Tosoh Corporation) can be used to calculate the weight average molecular weight.

In the thermosensitive coloring layer, the radical-polymerizable compound is preferably contained in a state of enclosing at least one of the electron-donating dye precursor or the electron-accepting compound. Note that "enclosing" in the present invention does not need to be completely surrounding the entire body of the electron-donating dye precursor and/or the electron-accepting compound within the radical-polymerizable compound and includes a case where part of them is exposed to the outside of the radical-polymerizable compound. At least one of the electron-donating dye precursor or the electron-accepting compound is preferably surrounded in a state of not being exposed to the outside of the radical-polymerizable compound, in order to further suppress contact between the electron-donating dye precursor and the electron-accepting compound. Note that the form of the radical-polymerizable compound in the thermosensitive coloring layer is not particularly limited, and examples of the form may include particles, a layer, and the like. The radical-polymerizable compound may enclose both the electron-donating dye precursor and the electron-accepting compound as long as the electron-donating dye precursor and the electron-accepting compound are in a state where they are unlikely to contact each other. However, the radical-polymerizable compound is preferably contained in the thermosensitive coloring layer in a state of separately enclosing the electron-donating dye precursor and the electron-accepting compound, in order to further reduce the likelihood of contact between the electron-donating dye precursor and the electron-accepting compound during storage of the thermosensitive recording medium.

For example, in the case where the radical-polymerizable compound is contained in the form of a layer in the thermosensitive coloring layer, the thermosensitive coloring layer preferably has a first layer containing the radical-polymerizable compound enclosing the electron-donating dye precursor and a second layer containing the radical-polymerizable compound enclosing the electron-accepting compound. Hereinafter, the first layer containing the radical-polymerizable compound enclosing the electron-donating dye precursor will be also be denoted as "electron-donating dye precursor layer" or "leuco layer". Also, the second layer containing the radical-polymerizable compound enclosing the electron-accepting compound will also be denoted as "electron-accepting compound layer" or "color developer layer".

On the other hand, in the case where the radical-polymerizable compound is contained in the form of particles in the thermosensitive coloring layer, the radical-polymerizable compound is preferably contained in the thermosensitive coloring layer in the form of first particles enclosing the electron-donating dye precursor and in the form of second particles enclosing the electron-accepting compound. The radical-polymerizable compounds forming the first particles and the second particles may be the same or different. At least one of the first particles or the second particles preferably contain the photoradical polymerization initiator to be described later.

The particle size of the first particles is preferably 10 nm or more and 1,000 nm or less and more preferably 50 nm or more and 300 nm or less. Also, the particle size of the second particles is preferably 10 nm or more and 1,000 nm or less and more preferably 50 nm or more and 300 nm or less. When the particle sizes of the first particles and the second particles are each 10 nm or more or even 50 nm or more, the radical polymerization reactivity is enhanced. Accordingly, the storage stability of an image can be improved. On the other hand, when the particle sizes of the first particles and the second particles are each 1,000 nm or less or even 300 nm or less, unnecessary optical scatter in the thermosensitive coloring layer is reduced. Accordingly, the image density can be enhanced. The particle sizes of the particles herein each mean a 50%-particle size (D50) based on volumetric distribution.

The content of the radical-polymerizable compound in the thermosensitive coloring layer is preferably 10% by mass or more and 1,000% by mass or less and more preferably 50% by mass or more and 500% by mass or less relative to the electron-donating dye precursor. 10% by mass or more makes fogging less likely to occur, and 50% by mass or more makes fogging even less likely to occur. On the other hand, 1,000% by mass or less makes the color development property of an image less likely to decrease, and 500% by mass or less further improves the color development property of an image.

The content of the radical-polymerizable compound in the particles made of the electron-accepting compound, the radical-polymerizable compound, and the photoradical polymerization initiator is preferably 10% by mass or more and 1,000% by mass or less relative to the electron-accepting compound. Also, the content is more preferably 50% by mass or more and 500% by mass or less. 10% by mass or more makes fogging less likely to occur, and 50% by mass or more makes fogging even less likely to occur. On the other hand, 1,000% by mass or less makes the color development property of an image less likely to decrease, and 500% by mass or less further improves the color development property of an image.

Photoradical Polymerization Initiator

The thermosensitive coloring layer contains a photoradical polymerization initiator. The photoradical polymerization initiator only needs to be a compound capable of generating a radical by action of light. As the photoradical polymerization initiator, various publicly known compounds can be used such as a radical generator, a radical polymerization initiator, and a photoradical polymerization initiator. Note that the photoradical polymerization initiator in the second thermosensitive coloring layer is preferably one that generates a radical with light having a longer wavelength than the wavelength with which the photoradical polymerization initiator in the first thermosensitive coloring layer generates a radical.

Examples of the photoradical polymerization initiator may include an aromatic ketone compound, acylphosphine oxide compound, benzoin alkyl ether compound, benzoin ether compound, thioxanthone compound, benzophenone compound, benzoate compound, aromatic onium salt compound, organic peroxide, thio compound (such as a thiophenyl group-containing compound), α-aminoalkylphenone compound, hexaarylbiimidazole compound, ketoxime ester compound, borate compound, azinium compound, metallocene compound, active ester compound, compound having a carbon-halogen bond, alkylamine compound, and the like. Also, radical generators disclosed in Japanese Patent Application Laid-Open No. 2018-35369, Japanese Patent Application Laid-Open No. 2018-39265, etc. can be used as well.

Among them, the aromatic ketone compound, acylphosphine oxide compound, benzoin alkyl ether compound, benzoin ether compound, thioxanthone compound, benzophenone compound, and benzoate compound are preferable. One kind of photoradical polymerization initiator can be used alone, or two or more kinds of photoradical polymerization initiators can be used in combination. The content of the photoradical polymerization initiator in the thermosensitive coloring layer is preferably 0.1% by mass or more and 30% by mass or less and more preferably 1% by mass or more and 25% by mass or less relative to the radical-polymerizable compound. In the case where the first particles and the second particles each contain a photoradical polymerization initiator, these photoradical polymerization initiators may be the same or different.

Examples of the aromatic ketone compound may include acetophenone, 2-hydroxy-2-methyl-1-phenyl-1-propanone, 2,2-diethoxyacetophenone, 2,2-dimethoxy-2-phenylacetophenone, 4-methylbenzophenone, 2,2'-phenyl p-tert-butyltrichloroacetophenone, p-tert-butyldichloroacetophenone, benzophenone, 4-phenylbenzophenone, methylbenzoylformate, 4-[(4-methylphenyl)thio]benzophenone, 4,4'-bis(diethylamino)benzophenone, N,N'-tetramethyl-4,4'-diaminobenzophenone (Michler's ketone), 1-hydroxycyclohexylphenyl ketone, 1-[4-(2-hydroxyethoxy)-phenyl]-2-hydroxy-2-methylpropane, 2-benzyl-2-dimethylamino-1-(4-morpholinophenyl)-butanone-1, 2-methyl-[4-(methylthio)phenyl]-2-morpholino-1-propane, 2-(dimethylamino)-2-[(4-methylphenyl)methyl]-1-[4-(4-morpholinyl)phenyl]-1-butanone, 2-hydroxy-1-{4-[4-(2-hydroxy-2-methyl-propionyl)-benzyl]-phenyl}-2-methyl-propane-1-one, and the like.

Examples of the acylphosphine oxide compound may include 2,4,6-trimethylbenzoyldiphenylphosphine oxide, bis(2,4,6-trimethylbenzoyl)-diphenylphosphine oxide, and the like.

Examples of the benzoin alkyl ether compound may include benzoin methyl ether, benzoin ethyl ether, benzoin butyl ether, benzoin isopropyl ether, and the like.

Examples of the benzoin ether compound may include methylbenzoin, ethylbenzoin, and the like.

Examples of the thioxanthone compound may include 2-chlorothioxanthone, 2,4-diethylthioxanthone, isopropylthioxanthone, 2-methylthioxanthone, and the like.

Examples of the benzophenone compound may include benzophenone, 4-methylbenzophenone, 4-phenylbenzophenone, 4-(4-methylphenylthio)benzophenone, 4,4'-bis(diethylamino)benzophenone, and the like.

Examples of the benzoate compound may include ethyl-4-(dimethylamino)-benzoate, ethylhexyl-4-dimethylaminobenzoate, methyl-o-benzoylbenzoate, 3-methylbutyl p-(dimethylamino)benzoate, and the like.

Among the above, the photoradical polymerization initiator is preferably at least one selected from the group consisting of diphenyl(2,4,6-trimethylbenzoyl)phosphine oxide, phenylbis(2,4,6-trimethylbenzoyl)phosphine oxide, 2-chlorothioxanthone, 2,4-diethylthioxanthone, isopropylthioxanthone, 4-phenylbenzophenone, 4-(4-methylphenylthio)benzophenone, 4,4'-bis(diethylamino)benzophenone, 2-(dimethylamino)-2-[(4-methylphenyl)methyl]-1-[4-(4-morpholinyl)phenyl]-1-butanone, 2-benzyl-2-dimethylamino-1-(4-morpholinophenyl)-butanone-1, and 2-methyl-1-[4-(methylthio)phenyl]-2-morpholinopropane-1-one.

(Other Components)

A storage stability improver can be contained in the thermosensitive coloring layer. With the storage stability improver contained in the thermosensitive coloring layer, the storage stability of an image after color development can be even further enhanced. Examples of the storage stability improver may include: phenol compounds such as 1,1,3-tris(2-methyl-4-hydroxy-5-cyclohexylphenyl)butane, 1,1,3-tris(2-methyl-4-hydroxy-5-tert-butylphenyl)butane, 1,1-bis(2-methyl-4-hydroxy-5-tert-butylphenyl)butane, 4,4'-[1,4-phenylenebis(1-methylethylidene)]bisphenol, and 4,4'-[1,3-phenylenebis(1-methylethylidene]bisphenol; epoxy compounds such as 4-benzyloxyphenyl-4'-(2-methyl-2,3-epoxypropyloxy)phenyl sulfone, 4-(2-methyl-1,2-epoxyethyl)diphenyl sulfone, and 4-(2-ethyl-1,2-epoxyethyl)diphenyl sulfone; isocyanuric acid compounds such as 1,3,5-tris(2,6-dimethylbenzyl-3-hydroxy-4-tert-butyl)isocyanuric acid; and the like.

A heat sensitizer can be contained in the thermosensitive coloring layer. With the heat sensitizer contained in the thermosensitive coloring layer, the recording sensitivity can be enhanced. Examples of the heat sensitizer may include: stearamide, methoxycarbonyl-N-stearic acid benzamide, N-benzoyl stearamide, N-eicosanamide, ethylenebis stearamide, behenamide, methylenebis stearamide, N-methylol stearamide, dibenzyl terephthalate, dimethyl terephthalate, dioctyl terephthalate, diphenyl sulfone, benzyl p-benzyloxybenzoate, phenyl 1-hydroxy-2-naphthoate, 2-naphthylbenzyl ether, m-terphenyl, p-benzylbiphenyl, di-p-chlorobenzyl oxalate ester, di-p-methylbenzyl oxalate ester, dibenzyl oxalate ester, p-tolylbiphenyl ether, di(p-methoxyphenoxyethyl)ether, 1,2-di(3-methylphenoxy)ethane, 1,2-di(4-methylphenoxy)ethane, 1,2-di(4-methoxyphenoxy)ethane, 1,2-di(4-chlorophenoxy)ethane, 1,2-diphenoxyethane, 1-(4-methoxyphenoxy)-2-(3-methylphenoxy)ethane, p-methylthiophenylbenzyl ether, 1,4-di(phenylthio)butane, p-acetotoluidide, p-acetophenetidide, N-acetoacetyl-p-toluidine, 1,2-diphenoxymethylbenzene, di(β-biphenylethoxy)benzene, p-di(vinyloxyethoxy)benzene, 1-isopropylphenyl-2-phenylethane, di-o-chlorobenzyl adipate, 1,2-bis(3,4-dimethylphenyl)ethane, 1,3-bis(2-naphthoxy)propane, diphenyl, benzophenone, and the like. The content of the heat sensitizer in the thermosensitive coloring layer only needs to be an amount effective for increasing the heat sensitivity. Specifically, the content is preferably 2% by mass or more and 40% by mass or less and preferably 5% by mass or more and 25% by mass or less in the entire amount of solids in the thermosensitive coloring layer.

Aids such as the storage stability improver and the heat sensitizer may be mixed in the form of fine particles dispersed in water (solid dispersion fine particles) into an application liquid for forming the thermosensitive coloring layer. Alternatively, these aids can be dissolved in a solvent and used in an emulsified state with a water-soluble high polymer compound used as an emulsifier. Also, the storage stability improver and the heat sensitizer may be contained in particles containing the electron-donating dye precursor and the electron-accepting compound.

A polymerization promotor can be contained in the thermosensitive coloring layer. Examples of the polymerization promotor may include a benzoate compound, an amine compound, and the like.

Examples of the benzoate compound may include ethyl-4-(dimethylamino)-benzoate, ethylhexyl-4-dimethylamino-benzoate, methyl-o-benzoylbenzoate, 3-methylbutyl p-(dimethylamino)benzoate, N,N-dimethylamino benzoic acid ethyl ester, N,N-dimethylamino benzoic acid isoamyl ester, pentyl 4-dimethylaminobenzoate, triethylamine, triethanolamine, and the like.

A sensitizer can be contained in the thermosensitive coloring layer. The sensitizer only needs to be one that sensitizes the photoradical polymerization initiator with an electron transfer mechanism or an energy transfer mechanism. Examples of the sensitizer may include: aromatic polycondensed ring compounds such as anthracene, 9,10-dialkoxyanthracene, pyrene, and perylene; aromatic ketone compounds such as acetophenone, benzophenone, thioxanthone, and Michler's ketone; and heterocyclic compounds such as phenothiazine, and N-aryloxazolidinone. The content of the sensitizer in the thermosensitive coloring layer is preferably 0.1 part by mass or more and 10 parts by mass or less and more preferably 1 part by mass or more and 5 parts by mass or less relative to 1 part by mass of the photoradical polymerization initiator.

In order to improve the electron transfer efficiency or energy transfer efficiency between the sensitizer and the photoradical polymerization initiator, a sensitization aid is preferably contained in the thermosensitive coloring layer. Examples of the sensitization aid may include: naphthalene compounds such as 1,4-dihydroxynaphthalene, 1,4-dimethoxynaphthalene, 1,4-diethoxynaphthalene, 4-methoxy-1-naphthol, and 4-ethoxy-1-naphthol; benzene compounds such as 1,4-dihydroxybenzene, 1,4-dimethoxybenzene, 1,4-diethoxybenzene, 1-methoxy-4-phenol, and 1-ethoxy-4-phenol; and the like. The content of the sensitization aid in the thermosensitive coloring layer is preferably 0.1 part by mass or more and 10 parts by mass or less and preferably 0.5 part by mass or more and 5 parts by mass or less relative to 1 part by mass of the sensitizer.

A radical polymerization inhibitor can be contained in the thermosensitive coloring layer. The photoradical polymerization initiator slightly decomposes into a radical compound during storage of the thermosensitive recording medium. There is a case where a polymerization is induced by this radical compound. For this reason, a radical polymerization inhibitor is preferably contained in the thermosensitive coloring layer in order to inhibit this polymerization.

Examples of the radical polymerization inhibitor may include quinones such as a phenol-based hydroxyl group-containing compound, methoquinone (hydroquinone monomethyl ether) hydroquinone, and 4-methoxy-1-naphthol, hindered amine-based antioxidant, 1,1-diphenyl-2-picrylhydrazyl free radical, N-oxyl free radical compounds, nitrogen-containing heterocyclic mercapto-based compound, thioether-based antioxidant, hindered phenol-based antioxidant, ascorbic acids, zinc sulfate, thiocyanates, thiourea derivative, various saccharides, phosphoric acid-based antioxidant, nitrite, sulfite, thiosulfate, hydroxylamine derivative, aromatic amine, phenylenediamines, imines, sulfonamides, urea derivative, oximes, polycondensate of dicyandiamide and polyalkylenepolyamine, sulfur-containing compound such as phenothiazine, tetraazaannulene (TAA)-based complexing agent, hindered amines, and the like.

Among them, phenols, N-oxyl free radical compounds, 1,1-diphenyl-2-picrylhydrazyl free radical, phenothiazine, quinones, and hindered amines are preferable as the radical polymerization inhibitor. Also, N-oxyl free radical compounds are more preferable. The content of the radical polymerization inhibitor in the thermosensitive coloring layer is preferably 1 ppm or more and 5,000 ppm or less relative to the content of the radical-polymerizable compound based on mass.

A pigment with a high degree of whiteness having an average particle size of 10 μm or less can be contained in the thermosensitive coloring layer. With such a pigment contained, the degree of whiteness of the thermosensitive coloring layer can be improved while also evenness of an image can be improved. Examples of the pigment may include: inorganic pigments such as calcium carbonate, magnesium carbonate, kaolin, clay, talc, calcined clay, silica, diatomite, synthetic aluminum silicate, zinc oxide, titanium oxide, aluminum hydroxide, barium sulfate, and surface-treated calcium carbonate and silica; and organic pigments such as a urea-formalin resin, styrene-methacrylic acid copolymer resin, and polystyrene resin. The content of the pigment in the thermosensitive coloring layer is preferably an amount that does not lower the density of the developed color of an image. Specifically, the content is preferably 50% by mass or less in the entire amount of solids in the thermosensitive coloring layer.

A binder can be used as a component for forming the thermosensitive coloring layer. Moreover, a cross-linking agent, waxes, a metallic soap, a colored dye, a colored pigment, a fluorescent dye, and so on can be contained as necessary. Examples of the binder may include: polyvinyl alcohol and derivatives thereof, starch and derivatives thereof; cellulose derivatives such as hydroxymethyl cellulose, hydroxyethyl cellulose, hydroxypropyl cellulose, methyl cellulose, and ethyl cellulose; water-soluble high polymer materials such as sodium polyacrylate, polyvinylpyrrolidone, acrylamide-acrylic acid ester copolymer, acrylamide-acrylic acid ester-methacrylic acid ester copolymer, styrene-maleic anhydride copolymer, isobutylene-maleic anhydride copolymer, casein, gelatin, and derivatives thereof, emulsions such as polyvinyl acetate, polyurethane, polyacrylic acid, polyacrylic acid ester, vinyl chloride-vinyl acetate copolymer, polybutyl methacrylate, and ethylene-vinyl acetate copolymer; latexes of water-insoluble polymers such as styrene-butadiene copolymer and styrene-butadiene-acrylic copolymer; and the like.

With the cross-linking agent contained in the thermosensitive coloring layer, the water resistance of the thermosensitive coloring layer can be improved. Examples of the cross-linking agent may include: organic compounds such as an aldehyde-based compound such as glyoxal, polyamine-based compound such as polyethyleneimine, epoxy-based compound, polyamide resin, melamine resin, glyoxylate, dimethylolurea compound, aziridine compound, and blocked isocyanate compound; inorganic compounds such as ammonium persulfate, ferric chloride, magnesium chloride, sodium tetraborate, and potassium tetraborate; as well as boric acid, boric acid triester, boron-based polymer, hydrazide compound, glyoxylate, and the like. The content of the cross-linking agent in the thermosensitive coloring layer is preferably 1 part by mass or more and 10 parts by mass or less relative to the entire amount of solids in the thermosensitive coloring layer being 100 parts by mass.

Examples of the waxes may include: waxes such as paraffin wax, carnauba wax, microcrystalline wax, polyolefin wax, and, polyethylene wax; higher fatty acid amides such as stearamide and ethylenebis stearamide; higher fatty acid esters and derivatives thereof, and the like. Also, examples of the metallic soap may include polyvalent metal salts of higher fatty acids such as zinc stearate, aluminum stearate, calcium stearate, and zinc oleate.

When the thermosensitive recording medium is a two-color thermosensitive recording medium, a colored dye or colored pigment of a tone that complements a tone that is developed at low temperature is preferably contained in the thermosensitive coloring layer. With such a colored dye or colored pigment contained in the thermosensitive coloring layer, the tone of the thermosensitive recording medium before and after image formation can be adjusted. Further, various aids such as an oil repellent, a defoamer, and a viscosity modifier can be contained in the thermosensitive coloring layer as necessary.

The thermosensitive coloring layer can be formed by, for example, applying an application liquid for the thermosensitive coloring layer containing the constituent components of the thermosensitive coloring layer and water as a dispersion medium onto the support to thereby form a coating layer, and then drying this coating layer. The amount of the application liquid to be applied is preferably 2 $g/m^2$ or more and 20 $g/m^2$ or less, more preferably 2 $g/m^2$ or more and 15 $g/m^2$ or less, and particularly preferably 2 $g/m^2$ or more and 10 $g/m^2$ or less in terms of dry mass.

It is preferable to use a surfactant in order to prepare the above-described first particles and second particles. Examples of the surfactant may include: anionic surfactants such as sodium alkyl sulfonate, sodium alkylbenzene sulfonate, sodium dialkyl sulfosuccinate, and sodium alkyl carboxylate; nonionic surfactants such as polyoxyethylene alkyl ether, polyoxyethylene alkyl ester, polyoxyethylene polyoxypropylene glycol, sorbitan alkyl ester, polyoxyethylene sorbitan alkyl ester, glycerin alkyl ester, and polyoxyethylene hydrogenated castor oil; cationic surfactants such as alkyltrimethylammonium chloride, dialkyldimethylammonium chloride, and alkylbenzyldimethylammonium chloride; and amphoteric surfactants such as alkylbetaine, and alkyldimethylamine oxide. Further, it is possible to use a high polymer surfactant such as a sodium salt of a formalin naphthalenesulfonate condensate or sodium polyacrylate.

It is also possible to bond an ionic group such as a sulfonic acid group, carboxylic acid group, or amino group or a hydrophilic non-ionic group such as a polyoxyethylene group or polyglyceryl group to the radical-polymerizable compound, and use the radical-polymerizable compound, to which a surface active property is thus imparted.

It is also possible to use a dispersion aid in order to prepare the above-described first particles and second particles. Examples of the dispersion aid may include water-soluble high polymers such as polyvinyl alcohol and modified products thereof, polyacrylamide and derivatives thereof, ethylene/vinyl acetate copolymer, styrene/maleic anhydride copolymer, ethylene/maleic anhydride copolymer, isobutylene/maleic anhydride copolymer, polyvinylpyrrolidone, ethylene/acrylic acid copolymer, vinyl acetate/acrylic acid copolymer, carboxymethyl cellulose, methyl cellulose, casein, gelatin, starch derivatives, gum arabic, and sodium alginate.

The amounts of the surfactant and the dispersion aid to be added are both preferably 0.1% by mass or more and 10% by mass or less and more preferably 0.5% by mass or more and 5% by mass or less based on the masses of the first particles and the second particles.

Intermediate Layers

The first intermediate layer containing a UV absorber (also referred to as the first UV absorption layer) is disposed between the first thermosensitive coloring layer and the second thermosensitive coloring layer. Incidentally, it is preferable to include a second intermediate layer (also referred to as the second UV absorption layer) and the third thermosensitive coloring layer disposed between the second thermosensitive coloring layer and the support in descending order of distance from the support. Further, it is preferable to include a protective layer and a protective intermediate layer (also referred to as the UV absorption layer under the protective layer) disposed on the first thermosensitive coloring layer. In other words, it is preferable to dispose an intermediate layer between the plurality of disposed thermosensitive coloring layers and between a thermosensitive coloring layer and the protective layer. Hereinafter, when the term "the intermediate layer" is simply used, it means all intermediate layers.

The transmittance of the first intermediate layer for light with a wavelength of 365 nm is preferably smaller than the transmittance of the first intermediate layer for light with a wavelength of 405 nm. Further, the transmittance of the first intermediate layer for light with a wavelength of 365 nm is preferably 5% or less. Furthermore, the transmittance of the first intermediate layer for light with a wavelength of 405 nm is preferably 20% or more.

A water-soluble high polymer material or a water-insoluble polymer used in publicly known thermosensitive recording media can be used as a constituent material of the intermediate layer. Specific examples of the constituent material of the intermediate layer can be similar to those of the binder being a constituent material of the thermosensitive coloring layer. Moreover, high-porosity particles such as silica or calcined kaolin, a plastic pigment, hollow particles, foam, and an organic compound such as a polyethylene wax having a glass transition temperature or melting point may be contained as aids in the intermediate layer.

The intermediate layer can be formed by, for example, applying an application liquid for the intermediate layer containing the constituent components of the intermediate layer and water as a dispersion medium to thereby form a coating layer, and then drying this coating layer. The amount of the application liquid to be applied is preferably 1 $g/m^2$ or more and 40 $g/m^2$ or less and more preferably 2 $g/m^2$ or more and 10 $g/m^2$ or less in terms of dry mass.

The first intermediate layer contains a UV absorber. With a UV absorber contained, the UV transmittance of the first intermediate layer can be controlled at a desired value. The UV absorber to be contained in the first intermediate layer is preferably one that absorbs UV rays with the wavelength with which the photoradical polymerization initiator in the first thermosensitive coloring layer generates a radical. A UV absorber is preferably contained in the intermediate layers other than the first intermediate layer since, in this way, their UV absorbance can be controlled. Note that the content of the UV absorber in the intermediate layer is not particularly limited as long as it is such an amount that the UV absorbance of the intermediate layer can be a desired value.

As the UV absorber, a benzotriazole-based UV absorber, triazine-based UV absorber, benzophenone-based UV absorber, cyanoacrylate-based UV absorber, salicylic acid-based UV absorber, titanium oxide, or the like can be used. Also, the UV absorber is preferably at least one selected from the group consisting of the compounds represented by the following general formulas (1) to (5) and titanium oxide.

(1)

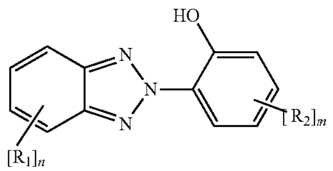

Here, $R_1$ represents an alkyl group having 1 to 8 carbon atoms that may have a substituent, an alkoxy group having 1 to 8 carbon atoms that may have a substituent, or a halogen atom, n represents an integer of 0 to 4, $R_2$ represents an alkyl group having 1 to 8 carbon atoms that may have a substituent, an aralkyl group having 7 to 12 carbon atoms that may have a substituent, or an alkylene group having 1 to 8 carbon atoms that may have a substituent, m represents an integer of 0 to 4, and when $R_2$ is an alkylene group having 1 to 8 carbon atoms that may have a substituent, a plurality of (2-hydroxy-phenyl)-benzotriazole structures may be bonded via the alkylene group.

(2)

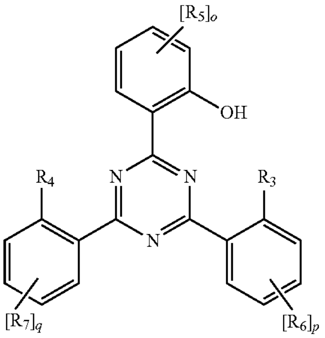

Here, $R_3$ and $R_4$ each independently represent a hydrogen atom, a methyl group, or a hydroxyl group, $R_5$, $R_6$, and $R_7$ each independently represent an alkyl group having 1 to 8 carbon atoms that may have a substituent or an alkoxy group having 1 to 8 carbon atoms that may have a substituent, and o, p, and q each independently represent an integer of 0 to 4.

(3)

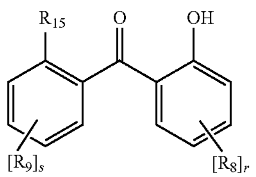

Here, $R_{15}$ represents a hydrogen atom, a methyl group, or a hydroxyl group, $R_8$ represents an alkyl group having 1 to 8 carbon atoms that may have a substituent, an aryl group having 6 to 12 carbon atoms that may have a substituent, an alkoxy group having 1 to 8 carbon atoms that may have a substituent, an aralkyl group having 7 to 12 carbon atoms that may have a substituent, or an alkylene group having 1 to 8 carbon atoms that may have a substituent, r represents an integer of 0 to 4, when $R_8$ is an alkylene group having 1 to 8 carbon atoms that may have a substituent, a plurality of 2-hydroxy-benzophenone structures may be bonded via the alkylene group, $R_9$ represents an alkyl group having 1 to 8 carbon atoms that may have a substituent, an aryl group having 6 to 12 carbon atoms that may have a substituent, an alkoxy group having 1 to 8 carbon atoms that may have a substituent, or an aralkyl group having 7 to 12 carbon atoms that may have a substituent, and s represents an integer of 0 to 4.

(4)

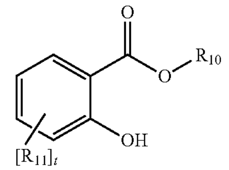

Here, $R_{10}$ represents an alkyl group having 1 to 18 carbon atoms that may have a substituent, an aryl group having 6 to 12 carbon atoms that may have a substituent, or an aralkyl group having 7 to 12 carbon atoms that may have a substituent, Ru represents an alkyl group having 1 to 8 carbon atoms that may have a substituent, an aryl group having 6 to 12 carbon atoms that may have a substituent, an alkoxy group having 1 to 8 carbon atoms that may have a substituent, or an aralkyl group having 7 to 12 carbon atoms that may have a substituent, and t represents an integer of 0 to 4.

(5)

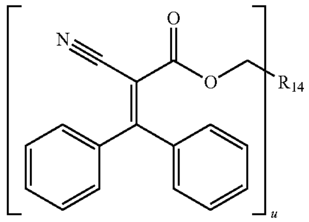

Here, u represents an integer of 1 to 4, when u is 1, $R_{14}$ represents an alkyl group having 1 to 8 carbon atoms that may have a substituent or an aralkyl group having 7 to 12 carbon atoms that may have a substituent, and when u is 2 to 4, $R_{14}$ represents a linking group having a valence of u.

Examples of commercially available products of the benzotriazole-based UV absorber may include, hereinafter by their trade names: Tinuvin PS, Tinuvin 99-2, Tinuvin 326, Tinuvin 328, Tinuvin 384-2, Tinuvin 900, Tinuvin 928, Tinuvin 1130, Tinuvin CarboProtect, and UVA-805 (all of which are manufactured by BASF); ADK STAB LA-36 (manufactured by ADEKA Corporation); and the like.

Examples of commercially available products of the triazine-based UV absorber may include, hereinafter by their trade names: Tinuvin 400, Tinuvin 405, Tinuvin 460, Tinuvin 477, Tinuvin 479, Tinuvin 400-DW(N), Tinuvin 477-DW(N), and Tinuvin 479-DW(N) (all of which are manufactured by BASF); LA-F70 and LA-46 (all of which are manufactured by ADEKA Corporation); and the like.

Examples of commercially available products of the benzophenone-based UV absorber may include, hereinafter by their trade name: UVA-935LH (manufactured by BASF); ADK STAB 1413 (manufactured by ADEKA Corporation); and the like. Examples of the salicylic acid-based UV absorber may include methyl salicylate, butyl salicylate, octyl salicylate phenyl salicylate, and the like. Examples of commercially available products of the cyanoacrylate-based UV absorber may include, hereinafter by their trade names, Uvinul 3035, Uvinul 3039, and Uvinul 3030 (all of which are manufactured by BASF), and the like. Examples of the titanium oxide may include rutile titanium oxide and anatase titanium oxide.

Protective Layer

It is preferable to have a protective layer over the thermosensitive coloring layer. As the protective layer, it is possible to use a protective layer used in publicly known thermosensitive recording media. For example, it is preferable to provide a protective layer containing a water-soluble high polymer material and particles. Also, between the first thermosensitive coloring layer and the protective layer, there may be provided an intermediate layer under the protective layer (hereinafter also referred to as "protective intermediate layer"). In other words, it is preferable that the thermosensitive recording medium further include a protective layer and a protective intermediate layer disposed on the first thermosensitive coloring layer. As the water-soluble high polymer material and particles, it is possible to use materials similar to those that can be contained in the thermosensitive coloring layer. Further, it is also preferable to impart water resistance to the protective layer by adding a cross-linking agent.

When microcapsules enclosing the UV absorber or solid dispersion fine particles of the UV absorber are contained in the protective layer, the light fastness can be greatly improved. Among these, microcapsules having a wall film made of a polyurethane-polyurea resin or an aminoaldehyde resin are preferable since they have good heat resistance and also exhibit good additional effects such as suppression of sticking to thermal heads. Also, microcapsules having a wall film made of a polyurethane-polyurea resin or an aminoaldehyde resin have a lower refractive index than that of microcapsules having a wall film made of another resin. Moreover, the fact that the shape is spherical is preferable since, in this way, a density decrease is less likely to occur due to diffuse reflection of light even when a large number of microcapsules are added in the protective layer.

Also, containing particles in the protective layer is preferable since, in this way, attachment and sticking of dirt to the thermals head can be prevented. The oil absorption of the particles is preferably 50 mL/100 g or more. The content of the particles in the protective layer is preferably an amount that does not lower the density of the color developed. Specifically, it is preferably 60% by mass or less in the entire amount of solids in the protective layer.

The protective layer can be formed by, for example, applying an application liquid for the protective layer containing the constituent components of the protective layer and water as a dispersion medium onto the corresponding thermosensitive coloring layer to thereby form a coating layer, and then drying this coating layer. The amount of the application liquid to be applied is preferably 0.1 $g/m^2$ or more and 15 $g/m^2$ or less and more preferably 0.5 $g/m^2$ or more and 8 $g/m^2$ or less in terms of dry mass.

Resin Layer

A resin layer made of a resin cured by an electron beam or UV ray can be provided on each of the thermosensitive coloring layer, the intermediate layer, and the protective layer. Resins disclosed in, for example, Japanese Patent Application Laid-Open No. S58-177392, etc. can be used as the resin to be cured by an electron beam. Aids such as a non-electron beam-curable resin, particles, defoamer, leveling agent, lubricant, surfactant, and plasticizer may be added as appropriate to the resin forming the resin layer. Among these, it is preferable to add a lubricant such as particles of calcium carbonate, aluminum hydroxide, or the like, waxes, or silicon since, in this way, sticking to the thermal heads can be suppressed.

Other Layers

By processing the thermosensitive recording medium to thereby impart higher functions thereto, added values of the thermosensitive recording medium can be enhanced. For example, by applying an adhesive, a remoistenable adhesive, delayed-tack adhesive, or the like to the back surface, an adhesive sheet, remoistenable sheet, or delayed-tack sheet can be obtained. Alternatively, by imparting the function of a thermal transfer sheet, inkjet recording sheet, carbonless copy paper, electrostatic recording sheet, xerographic sheet, or the like to the back surface, a recording sheet capable of double-sided recording can be obtained. Still alternatively, by disposing the thermosensitive coloring layer on the back surface, a double-sided thermosensitive recording medium can be obtained. Yet still alternatively, a back layer can be provided on the back surface of the thermosensitive recording medium to suppress penetration of oils and plasticizer from the back surface, control curling, or prevent electrostatic charging.

Layer Configuration of Thermosensitive Recording Medium

FIG. 1 is a cross-sectional view illustrating one embodiment of the thermosensitive recording medium of the present invention. A thermosensitive recording medium 100 illustrated in FIG. 1 includes a sheet-shaped support 50. Moreover, on one surface side of this support 50 are disposed a third thermosensitive coloring layer 30, second intermediate layer 25, second thermosensitive coloring layer 20, first intermediate layer 15, first thermosensitive coloring layer 10, protective intermediate layer 5, and protective layer 1 laminated in this order. In the following, layers close to the support 50 will be defined as lower layers while layers on the opposite side will be defined as upper layers. The thermosensitive recording medium 100 representing an embodiment of the present invention does not have to be provided with the third thermosensitive coloring layer 30, second intermediate layer 25, protective intermediate layer 5, and protective layer 1 as illustrated in FIG. 1.

Specifically, a radical-polymerizable compound and a photoradical polymerization initiator are contained in each thermosensitive coloring layer other than the lowermost layer (second thermosensitive coloring layer 20 and first thermosensitive coloring layer 10). In consideration of outdoor installation and other similar situations, a UV absorber is preferably contained in the protective intermediate layer 5 in order to improve the light fastness. Note that the UV transmittance of the protective intermediate layer 5 is preferably 10% or more. The second intermediate layer 25 is a layer for suppressing the occurrence of color turbidity due to contact between the second thermosensitive coloring layer 20 and the third thermosensitive coloring layer 30. The second intermediate layer 25 is preferably made of a resin that is solid at 25° C.

The support 50 only needs to be one made of a material on which a coating film can be formed using an application liquid for the thermosensitive coloring layer (thermosensitive coloring composition). Examples of the constituent material of the support 50 may include paper, synthetic paper, various plastics, and the like. Examples of the plastics may include PET (polyethylene terephthalate), OPP (oriented polypropylene), and the like. The surface of the support 50 is preferably subjected to corona discharge treatment, sand blasting treatment, primer treatment (lamination of a primer layer), or the like as necessary. Performing these treatments can, for example, improve the wettability of the surface of the support 50, roughen the surface, or facilitate adhesion and enhance the formability of the coating film with the thermosensitive coloring composition.

The coating film can be formed by applying or printing the thermosensitive coloring composition onto the support 50. Examples of the means for applying or printing the thermosensitive coloring composition may include a blade coater, a rod coater, a reverse roll coater, a die coater, an offset printing press, a gravure printing press, a flexographic printing press, a relief printing press, a silkscreen printing press, and the like. The intermediate layers (including the protective intermediate layer) and the protective layer can each be formed by using an intermediate layer composition or overcoat composition prepared by a method similar to the method of preparing the thermosensitive coloring composition. By coating a predetermined portion with the intermediate layer composition or overcoat composition, a coating film can be formed. By drying the coating films after they are formed, the respective layers can be formed. As a result, the intended thermosensitive recording medium can be obtained. The coating films may be applied and dried layer by layer. The same application liquid may applied and dried two or more times separately. Alternatively, simultaneous multilayer application may be performed in which two or more application liquids are simultaneously applied. It is preferable to perform smoothing treatment by a known method such as super calendering or soft calendering at any stage such as after the formation of each individual layer or after the formation of all layers. Performing the surface smoothing treatment can improve the recording sensitivity and also enhance the evenness of an image to be formed.

Image Forming Method

Next, an image forming method of the present invention will be described. The image forming method of the present invention has a step (a) of heating the above-described thermosensitive recording medium 100 to thereby cause the first thermosensitive coloring layer 10 to color, and a step (b) of irradiating the colored thermosensitive coloring layer 10 with a first UV ray 1 to thereby polymerize the radical-polymerizable compound in the first thermosensitive coloring layer 10. The image forming method of the present invention further has a step (c) of heating the thermosensitive recording medium 100 irradiated with the UV ray to thereby cause the second thermosensitive coloring layer 20 to color, and a step (d) of irradiating the colored second thermosensitive coloring layer 20 with a second UV ray 2 to thereby polymerize the radical-polymerizable compound in the second thermosensitive coloring layer 20. Here, in the step (c), the thermosensitive recording medium 100 irradiated with the first UV ray 1 is heated at a temperature higher than the heating temperature for the thermosensitive recording medium 100 in the step (a) to thereby cause the second thermosensitive coloring layer 20 to color. Also, in the step (d), the colored second thermosensitive coloring layer 20 is irradiated with the second UV ray 2 having a longer wavelength than that of the first UV ray 1 to thereby polymerize the radical-polymerizable compound in the second thermosensitive coloring layer 20. Note that in the case of using the thermosensitive recording medium 100 including the second intermediate layer 25 and the third thermosensitive coloring layer 30 disposed between the second thermosensitive coloring layer 20 and the support 50 in descending order of distance from the support, the image forming method of the present invention further has a step (e) of heating the thermosensitive recording medium 100 irradiated with the second UV ray 2 in the step (d) to thereby cause the third thermosensitive coloring layer 30 to color.

To heat the thermosensitive recording medium 100, for example, a thermal head is used such that the applied voltage is kept constant while the width of each single pulse and the number of repetitions are controlled. Alternatively, the control is done by changing the applied voltage while fixing the width of each single pulse. Such control enables an image to be formed while the thermal energy to be applied is set as appropriate.

Details of the image forming method will be specifically described with reference to a drawing. In the case of forming an image in the thermosensitive recording medium 100 illustrated in FIG. 1, firstly, a thermal energy reaching the coloring starting temperature of the first thermosensitive coloring layer 10 but not reaching the coloring starting temperatures of the second thermosensitive coloring layer 20 and the third thermosensitive coloring layer 30 is applied to thereby cause the first thermosensitive coloring layer 10 to color (step (a)). Then, the first UV ray with the wavelength with which the photoradical polymerization initiator in the first thermosensitive coloring layer 10 can react is applied to thereby polymerize the radical-polymerizable compound in the first thermosensitive coloring layer 10, so that the first thermosensitive coloring layer 10 is fixed (step (b)). The fixed first thermosensitive coloring layer 10 will not color further even when a thermal energy that brings it to its coloring starting temperature is applied. Thereafter, a thermal energy reaching the coloring starting temperature of the second thermosensitive coloring layer 20 but not reaching the coloring starting temperature of the third thermosensitive coloring layer 30 is applied to thereby cause the second thermosensitive coloring layer 20 to color (step (c)). Then, the second UV ray with the wavelength with which the photoradical polymerization initiator in the second thermosensitive coloring layer 20 can react is applied to thereby polymerize the radical-polymerizable compound in the second thermosensitive coloring layer 20, so that the second thermosensitive coloring layer 20 is fixed (step (d)). Thereafter, a thermal energy reaching the coloring starting temperature of the third thermosensitive coloring layer 30 is applied to thereby cause the third thermosensitive coloring layer 30 to color (step (e)).

It is preferable that the wavelength of the second UV ray to be applied to the second thermosensitive coloring layer 20 be longer than the wavelength of the first UV ray to be applied to the first thermosensitive coloring layer 10 by 20 nm or more, from a viewpoint of further suppressing the occurrence of color turbidity. Also, it is preferable that the transmittance of the protective intermediate layer 5 for the first UV ray to be applied to the first thermosensitive coloring layer 10 be 5% or less and the transmittance of the protective intermediate layer 5 for the second UV ray to be applied to the second thermosensitive coloring layer 20 be 20% or more, from a viewpoint of further suppressing color turbidity. Further, the wavelength of the first UV ray to be applied to the first thermosensitive coloring layer 10 is preferably 345 nm or more and 385 nm or less, more preferably 355 nm or more and 375 nm or less, and even more preferably 365 nm. Further, the wavelength of the second UV ray to be applied to the second thermosensitive coloring layer 20 is preferably more than 385 nm and 425 nm or less, more preferably 395 nm or more and 415 nm or less, and even more preferably 405 nm. The occurrence of color turbidity can be further suppressed by setting the wavelengths of the first and second UV rays to be applied to the first thermosensitive coloring layer 10 and the second thermosensitive coloring layer 20 in the above respective ranges. Note that the wavelengths of the UV rays herein mean the peak wavelengths of the UV rays to be applied.

The heating temperature for the thermosensitive recording medium 100 in the step (c) is higher than the heating temperature for the thermosensitive recording medium 100 in the step (a). Also, it is preferable that the heating temperature for the thermosensitive recording medium 100 in the step (a) be 120° C. or more and 140° C. or less, and the heating temperature for the thermosensitive recording medium 100 in the step (c) be 150° C. or more and less than 170° C.

In the case of using the thermosensitive recording medium 100 including the second intermediate layer 25 and the third thermosensitive coloring layer 30 between the second thermosensitive coloring layer 20 and the support, the heating temperature for the thermosensitive recording medium 100 in the step (e) is preferably higher than the heating temperature for the thermosensitive recording medium 100 in the step (c). Further, the heating temperature for the thermosensitive recording medium 100 in the step (e) is preferably 165° C. or more.

EXAMPLES

Hereinafter, the present invention will be described in more detail based on Examples and Comparative Examples. However, the present invention is by no means limited to the following Examples as long as the gist thereof is not exceeded. The amounts of components represented by "part (s)" and "%" are based on mass, unless otherwise noted.

Example 1

[Preparation of Application Liquid for First Thermosensitive Coloring Layer]

The following materials were mixed and dissolved to thereby prepare an [oil phase A1] liquid, [oil phase B1] liquid, and [water phase C] liquid.

[Oil Phase A1] Liquid: Composition Containing an Electron-Donating Dye Precursor

| | |
|---|---|
| Electron-donating dye precursor (YELLOW435, manufactured by Fukui Yamada Chemical Co., Ltd.) | 40 parts |
| Radical-polymerizable compound (SR355, manufactured by Arkema) | 47 parts |
| Photoradical polymerization initiator (Omnirad 184, manufactured by iGM Resin) | 13 parts |
| Ethyl acetate | 120 parts |

[Oil Phase B1] Liquid: Composition Containing an Electron-Accepting Compound

| | |
|---|---|
| Electron-accepting compound (D-8, manufactured by Nippon Soda Co., Ltd.) | 40 parts |
| Radical-polymerizable compound (SR355, manufactured by Arkema) | 47 parts |
| Photoradical polymerization initiator (Omnirad 184, manufactured by iGM Resin) | 13 parts |
| Ethyl acetate | 120 parts |

[Water Phase C] Liquid

| | |
|---|---|
| Polyvinyl alcohol (Kuraray Poval 5-88, manufactured by Kuraray Co., Ltd.) | 2.5 parts |
| Sodium di-2-ethylhexyl sulfosuccinate | 1.0 part |
| Sodium polyacrylate (Aron T-50, manufactured by Toagosei Co., Ltd.) | 1.0 part |
| Boric acid | 0.02 part |
| Sodium tetraborate decahydrate | 0.02 part |
| Water | 95.5 parts |

80 parts of the [Oil phase A1] liquid and 100 parts of the [water phase C] liquid were mixed and then emulsified using an ultrasonic homogenizer (UH-600S, manufactured by SMT Co., Ltd.). Then, the ethyl acetate was removed via depressurization using a rotary evaporator, so that an electron-donating dye precursor-containing particle dispersion liquid was obtained. The particle size (D50) of the particles in the electron-donating dye precursor-containing particle dispersion liquid measured using a particle size distribution measurement apparatus (Nanotrac, manufactured by Microtrac Inc.) was 150 nm.

80 parts of the [Oil phase B1] liquid and 100 parts of the [water phase C] liquid were mixed and then emulsified using an ultrasonic homogenizer (UH-600S, manufactured by SMT Co., Ltd.). Then, the ethyl acetate was removed via depressurization using a rotary evaporator, so that an electron-accepting compound-containing particle dispersion liquid was obtained. The particle size (D50) of the particles in the electron-accepting compound-containing particle dispersion liquid measured using a particle size distribution measurement apparatus (Nanotrac, manufactured by Microtrac Inc.) was 140 nm.

10 parts of the prepared electron-donating dye precursor-containing particle dispersion liquid and 40 parts of the prepared electron-accepting compound-containing particle dispersion liquid were mixed, so that an application liquid for the first thermosensitive coloring layer was obtained.

Preparation of Application Liquid for Second Thermosensitive Coloring Layer

The following materials were mixed and dissolved to thereby prepare an [oil phase A2] liquid and [oil phase B2] liquid.

[Oil Phase A2] Liquid: Composition Containing an Electron-Donating Dye Precursor

| | |
|---|---|
| Electron-donating dye precursor (RED-40, manufactured by (RED-40, manufactured by Yamamoto Chemicals Inc.) | 40 parts |
| Radical-polymerizable compound (SR355, manufactured by Arkema) | 47 parts |
| Photoradical polymerization initiator (Omnirad 184, manufactured by iGM Resin) | 13 parts |
| Ethyl acetate | 120 parts |

[Oil Phase B2] Liquid: Composition Containing an Electron-Accepting Compound

| | |
|---|---|
| Electron-accepting compound (D-90, manufactured by Nippon Soda Co., Ltd.) | 40 parts |
| Radical-polymerizable compound (SR355, manufactured by Arkema) | 47 parts |
| Photoradical polymerization initiator (Omnirad 184, manufactured by iGM Resin) | 13 parts |
| Ethyl acetate | 120 parts |

80 parts of the [Oil phase A2] liquid and 100 parts of the [water phase C] liquid were mixed and then emulsified using an ultrasonic homogenizer (UH-600S, manufactured by SMT Co., Ltd.). Then, the ethyl acetate was removed via depressurization using a rotary evaporator, so that an electron-donating dye precursor-containing particle dispersion liquid was obtained. The particle size (D50) of the particles in the electron-donating dye precursor-containing particle dispersion liquid measured using a particle size distribution measurement apparatus (Nanotrac, manufactured by Microtrac Inc.) was 150 nm.

80 parts of the [Oil phase B2] liquid and 100 parts of the [water phase C] liquid were mixed and then emulsified using an ultrasonic homogenizer (UH-600S, manufactured by SMT Co., Ltd.). Then, the ethyl acetate was removed via depressurization using a rotary evaporator, so that an electron-accepting compound-containing particle dispersion liquid was obtained. The particle size (D50) of the particles in the electron-accepting compound-containing particle dispersion liquid measured using a particle size distribution measurement apparatus (Nanotrac, manufactured by Microtrac Inc.) was 140 nm.

10 parts of the prepared electron-donating dye precursor-containing particle dispersion liquid and 40 parts of the prepared electron-accepting compound-containing particle dispersion liquid were mixed, so that an application liquid for the second thermosensitive coloring layer was obtained.

Preparation of Application Liquid for First Intermediate Layer

The following materials were mixed and dissolved to prepare an [oil phase D] liquid.

[Oil Phase D] Liquid: Composition Containing a UV Absorber

| | |
|---|---|
| 2-oxyphenylbenzotriazole diphenylphosphinate | 50 parts |
| Ethyl acetate | 100 parts |

80 parts of the [Oil phase D] liquid and 100 parts of the [water phase C] liquid were mixed and then emulsified using an ultrasonic homogenizer (UH-600S, manufactured by SMT Co., Ltd.). Then, the ethyl acetate was removed via depressurization using a rotary evaporator, so that an application liquid for the first intermediate layer was obtained.

Production of Thermosensitive Recording Medium

The application liquid for the second thermosensitive coloring layer was applied onto a 130 μm-thick synthetic paper (YUPO, manufactured by YUPO CORPORATION) such that the applied amount would be 11.25 g/$m^2$ after being dried, and was then dried to thereby form the second thermosensitive coloring layer. Then, the application liquid for the first intermediate layer was applied onto the formed second thermosensitive coloring layer such that the applied amount would be 11.25 g/$m^2$ after being dried, and was then dried to thereby form the first intermediate layer 15. Further, the application liquid for the first thermosensitive coloring layer was applied onto the formed first intermediate layer such that the applied amount would be 11.25 g/$m^2$ after being dried, and was then dried to thereby form the first thermosensitive coloring layer. As a result, the thermosensitive recording medium was obtained.

Formation of Images

Figure 2:
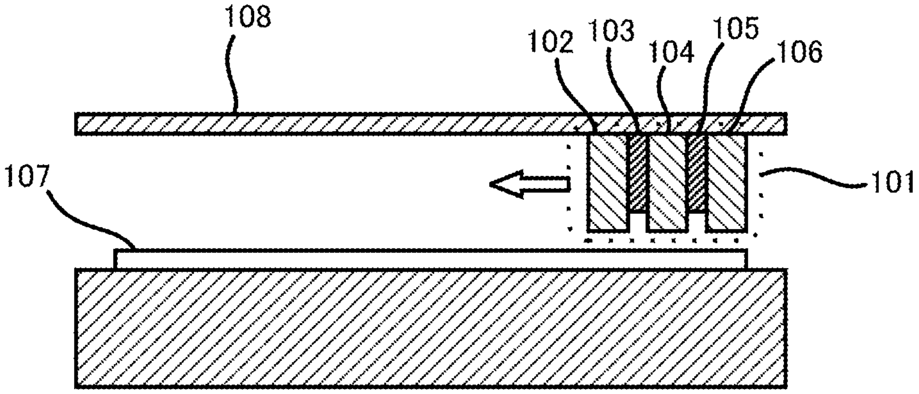
FIG. 2 is a schematic view illustrating the configuration of a recording apparatus used in Examples.

Images were formed using a recording apparatus having the configuration illustrated in FIG. 2. The recording apparatus illustrated in FIG. 2 includes a recording head 101 provided on a uniaxial stage 108. Images can be formed in a thermosensitive recording medium 107 by scanning the recording head 101 over it by means of the uniaxial stage 108. In the recording head 101, a thermal head 102 for the first thermosensitive coloring layer 10, a thermal head 104 for the second thermosensitive coloring layer 20, and a thermal head 106 for the third thermosensitive coloring layer 30 are disposed in this order from the starting point in the scanning direction. A UV light source 103 for the first thermosensitive coloring layer 10 is disposed between the thermal head 102 for the first thermosensitive coloring layer 10 and the thermal head 104 for the second thermosensitive coloring layer 20. Also, a UV light source 105 for the second thermosensitive coloring layer 20 is disposed between the thermal head 104 for the second thermosensitive coloring layer 20 and the thermal head 106 for the third thermosensitive coloring layer 30. Thermal heads manufactured by KYOCERA Corporation (trade name: "KPZ-48", effective recording width: 48 mm, total number of dots: 384) were used as the thermal heads 102, 104, and 106. The temperatures of the thermal heads 102, 104, and 106 were controlled with the pulse widths of voltages to be applied thereto. In the formation of images in the thermosensitive recording medium 107, thermal pulses are applied to the thermosensitive coloring layers of the thermosensitive recording medium 107 with the thermal heads 102, 104, and 106 in contact with the thermosensitive recording medium 107. In this way, desired images can be formed in the thermosensitive recording medium 107. Light sources manufactured by NICHIA CORPORATION (trade name: "NCSU275", wavelength: selected from four wavelengths of 365 nm, 375 nm, 385 nm, 395 nm, and 405 nm as appropriate) were used as the UV light sources 103 and 105. The scanning speed of the recording head 101 relative to the thermosensitive recording medium 107 was 100 mm/min.

The temperature of the thermal head 102 was set such that the temperature of the image recording portion would be 130° C. Also, the temperature of the thermal head 104 was set such that the temperature of the image recording portion would be 160° C. Note that the thermal head 106 was not used. The duty of the pulse width of the voltage to be applied to each thermal head was set at approximately 50% (the ratio of duration of voltage application in the heating time). The wavelength of the UV light source 103 was 365 nm, and the wavelength of the UV light source 105 was 405 nm, and the UV light sources 103 and 105 were set to flash during the recording.

Figure 3:
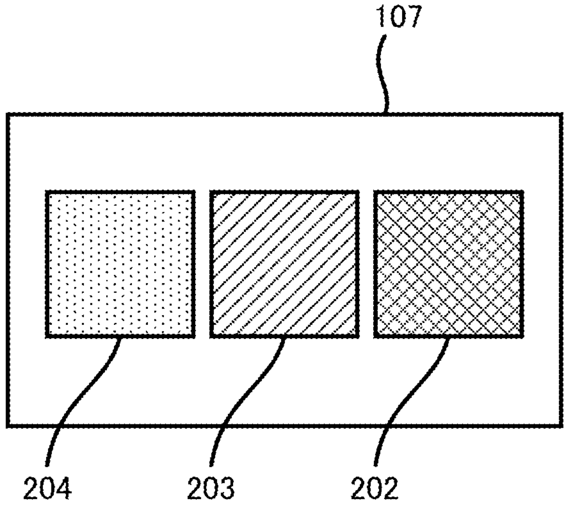
FIG. 3 is a schematic view illustrating a thermosensitive recording medium in which images were formed in Examples.

3 cm×3 cm solid images were formed in the thermosensitive recording medium 107 under the above conditions. FIG. 3 is a schematic view illustrating the thermosensitive recording medium 107 in which the images were formed. As illustrated in FIG. 3, an image 202 and an image 203 were formed in the thermosensitive recording medium 107 with the first thermosensitive coloring layer and the second thermosensitive coloring layer, respectively. Note that an image 204 was not formed with the third thermosensitive coloring layer.

Evaluation of Color Development Property and Color Turbidity

The optical reflection color densities of the formed images (the region of the image 202 and the region of the image 203 in FIG. 3) were measured using a reflection densitometer (trade name "Xrite 530", manufactured by Sakata Inx Engineering Co., Ltd.). The optical reflection density of yellow (Y) at the region of the image 202 (hereinafter referred to as "region 202") was high, and the region 202 colored well. The optical reflection density of magenta (M) at the region of the image 203 (hereinafter referred to as "region 203") was also high, and the region 203 colored relatively well. Moreover, the optical reflection density of yellow at the region 203 was low, and color turbidity with yellow hardly occurred at the region 203 at the time of coloring to magenta.

Example 2

A thermosensitive recording medium was obtained in a similar manner to Example 1 described above except that the amount of 2-oxyphenylbenzotriazole diphenylphosphinate was changed to 200 parts. Moreover, using the obtained thermosensitive recording medium, images were formed and evaluated in similar manners to Example 1 described above. As a result, the optical reflection density of magenta at the region 203 was improved. This is considered to be due to the fact that the transmittance of the first intermediate layer for UV rays (with a wavelength of 365 nm) was 5% or less and the transmittance for UV rays (with a wavelength of 405 nm) was 20% or more.

Example 3

A thermosensitive recording medium was obtained in a similar manner to Example 1 described above except that 100 parts of UVA-935LH (manufactured by BASF), corresponding to the compound represented by the general formula (3), was used as the UV absorber. Moreover, using the obtained thermosensitive recording medium, images were formed and evaluated in similar manners to Example 1 described above. As a result, the optical reflection density of magenta at the region 203 was further improved. This is considered to be due to the fact that the transmittance of the first intermediate layer 15 for UV rays (with a wavelength of 365 nm) was further lowered.

Example 4

A thermosensitive recording medium was obtained in a similar manner to Example 1 described above except that 100 parts of methyl salicylate, corresponding to the compound represented by the general formula (4), was used as the UV absorber. Moreover, using the obtained thermosensitive recording medium, images were formed and evaluated in similar manners to Example 1 described above. As a result, a similar advantageous effect to Example 3 was obtained.

Example 5

A thermosensitive recording medium was obtained in a similar manner to Example 1 described above except that 100 parts of Uvinul (manufactured by BASF), corresponding to the compound represented by the general formula (5), was used as the UV absorber. Moreover, using the obtained thermosensitive recording medium, images were formed and evaluated in similar manners to Example 1 described above. As a result, a similar advantageous effect to Example 3 was obtained.

Example 6

A thermosensitive recording medium was obtained in a similar manner to Example 1 described above except that 100 parts of rutile type titanium dioxide was used as the UV absorber. Moreover, using the obtained thermosensitive recording medium, images were formed and evaluated in similar manners to Example 1 described above. As a result, a similar advantageous effect to Example 3 was obtained.

Example 7

A thermosensitive recording medium was obtained in a similar manner to Example 1 described above except that the diphenyl(2,4,6-trimethylbenzoyl)phosphine oxide was used as the photoradical polymerization initiator. Moreover, using the obtained thermosensitive recording medium, images were formed and evaluated in similar manners to Example 1 described above. As a result, the optical reflection density of yellow at the region 203 decreased, thereby further suppressing color turbidity with yellow at the time of coloring to magenta. This is considered to be due to the fact that changing the photoradical polymerization initiator improved the fixability of the thermosensitive coloring layer.

Example 8

A thermosensitive recording medium was obtained in a similar manner to Example 1 described above except that the phenylbis(2,4,6-trimethylbenzoyl)phosphine oxide was used as the photoradical polymerization initiator. Moreover, using the obtained thermosensitive recording medium, images were formed and evaluated in similar manners to Example 1 described above. As a result, a similar advantageous effect to Example 7 was obtained.

Example 9

A thermosensitive recording medium was obtained in a similar manner to Example 1 described above except that the 2-chlorothioxanthone was used as the photoradical polymerization initiator. Moreover, using the obtained thermosensitive recording medium, images were formed and evaluated in similar manners to Example 1 described above. As a result, a similar advantageous effect to Example 7 was obtained.

Example 10

A thermosensitive recording medium was obtained in a similar manner to Example 1 described above except that the 2,4-diethylthioxanthone was used as the photoradical polymerization initiator. Moreover, using the obtained thermosensitive recording medium, images were formed and evaluated in similar manners to Example 1 described above. As a result, a similar advantageous effect to Example 7 was obtained.

Example 11

A thermosensitive recording medium was obtained in a similar manner to Example 1 described above except that the isopropylthioxanthone was used as the photoradical polymerization initiator. Moreover, using the obtained thermosensitive recording medium, images were formed and evaluated in similar manners to Example 1 described above. As a result, a similar advantageous effect to Example 7 was obtained.

Example 12

A thermosensitive recording medium was obtained in a similar manner to Example 1 described above except that the 4-phenylbenzophenone was used as the photoradical polymerization initiator. Moreover, using the obtained thermosensitive recording medium, images were formed and evaluated in similar manners to Example 1 described above. As a result, a similar advantageous effect to Example 7 was obtained.

Example 13

A thermosensitive recording medium was obtained in a similar manner to Example 1 described above except that the 4-(4-methylphenylthio)benzophenone was used as the photoradical polymerization initiator. Moreover, using the obtained thermosensitive recording medium, images were formed and evaluated in similar manners to Example 1 described above. As a result, a similar advantageous effect to Example 7 was obtained.

Example 14

A thermosensitive recording medium was obtained in a similar manner to Example 1 described above except that the 4,4'-bis(diethylamino)benzophenone was used as the photoradical polymerization initiator. Moreover, using the obtained thermosensitive recording medium, images were formed and evaluated in similar manners to Example 1 described above. As a result, a similar advantageous effect to Example 7 was obtained.

Example 15

A thermosensitive recording medium was obtained in a similar manner to Example 1 described above except that the 2-(dimethylamino)-2-[(4-methylphenyl)methyl]-1-[4-(4-morpholinyl)phenyl]-1-butanone was used as the photoradical polymerization initiator. Moreover, using the obtained thermosensitive recording medium, images were formed and evaluated in similar manners to Example 1 described above. As a result, a similar advantageous effect to Example 7 was obtained.

Example 16

A thermosensitive recording medium was obtained in a similar manner to Example 1 described above except that the 2-benzyl-2-dimethylamino-1-(4-morpholinophenyl)-butanone-1 was used as the photoradical polymerization initiator. Moreover, using the obtained thermosensitive recording medium, images were formed and evaluated in similar manners to Example 1 described above. As a result, a similar advantageous effect to Example 7 was obtained.

Example 17

A thermosensitive recording medium was obtained in a similar manner to Example 1 described above except that the 2-methyl-1-[4-(methylthio)phenyl]-2-morpholinopropane-1-one was used as the photoradical polymerization initiator. Moreover, using the obtained thermosensitive recording medium, images were formed and evaluated in similar manners to Example 1 described above. As a result, a similar advantageous effect to Example 7 was obtained.

Example 18

A thermosensitive recording medium was obtained in a similar manner to Example 7 described above except that 100 parts of Tinuvin PS (manufactured by BASF), corresponding to the compound represented by the general formula (1), was used as the UV absorber. Moreover, using the obtained thermosensitive recording medium, images were formed and evaluated in similar manners to Example 1 described above. As a result, the optical reflection density of magenta at the region 203 was further improved. This is considered to be due to the fact that the transmittance of the first intermediate layer for UV rays (with a wavelength of 365 nm) was further lowered.

Example 19

A thermosensitive recording medium was obtained in a similar manner to Example 7 described above except that 100 parts of Tinuvin 460 (manufactured by BASF), corresponding to the compound represented by the general formula (2), was used as the UV absorber. Moreover, using the obtained thermosensitive recording medium, images were formed and evaluated in similar manners to Example 1 described above.

Example 20

[Preparation of Application Liquid for Third Thermosensitive Coloring Layer]

The following materials were mixed and dissolved to thereby prepare an [oil phase A1] liquid, [oil phase B1] liquid, and [water phase C] liquid.

[Oil Phase A1] Liquid: Composition Containing an Electron-Donating Dye Precursor

| | |
|---|---|
| Electron-donating dye precursor ((GN-2, manufactured by Yamamoto Chemicals Inc.) | 40 parts |
| Amorphous polyester (VYLON 220, manufactured by Toyobo Co., Ltd.) | 60 parts |
| Ethyl acetate | 120 parts |

[Oil Phase B1] Liquid: Composition Containing an Electron-Accepting Compound

| | |
|---|---|
| Electron-accepting compound (TGSH(H), manufactured by Nippon Kayaku Co., Ltd.) | 40 parts |
| Amorphous polyester (VYLON 220, manufactured by Toyobo Co., Ltd.) | 60 parts |
| Ethyl acetate | 120 parts |

[Water Phase C] Liquid

| | |
|---|---|
| Polyvinyl alcohol (Kuraray Poval 5-88, manufactured by Kuraray Co., Ltd.) | 2.5 parts |
| Sodium di-2-ethylhexyl sulfosuccinate | 1.0 part |
| Sodium polyacrylate (Aron T-50, manufactured by Toagosei Co., Ltd.) | 1.0 part |
| Boric acid | 0.02 part |
| Sodium tetraborate decahydrate | 0.02 part |
| Water | 95.5 parts |

80 parts of the [Oil phase A1] liquid and 100 parts of the [water phase C] liquid were mixed and then emulsified using an ultrasonic homogenizer (UH-600S, manufactured by SMT Co., Ltd.). Then, the ethyl acetate was removed via depressurization using a rotary evaporator, so that an electron-donating dye precursor-containing particle dispersion liquid was obtained. The particle size (D50) of the particles in the electron-donating dye precursor-containing particle dispersion liquid measured using a particle size distribution measurement apparatus (Nanotrac, manufactured by Microtrac Inc.) was 150 nm.

80 parts of the [Oil phase B1] liquid and 100 parts of the [water phase C] liquid were mixed and then emulsified using an ultrasonic homogenizer (UH-600S, manufactured by SMT Co., Ltd.). Then, the ethyl acetate was removed via depressurization using a rotary evaporator, so that an electron-accepting compound-containing particle dispersion liquid was obtained. The particle size (D50) of the particles in the electron-accepting compound-containing particle dispersion liquid measured using a particle size distribution measurement apparatus (Nanotrac, manufactured by Microtrac Inc.) was 140 nm.

10 parts of the prepared electron-donating dye precursor-containing particle dispersion liquid and 40 parts of the prepared electron-accepting compound-containing particle dispersion liquid were mixed, so that an application liquid for the third thermosensitive coloring layer was obtained.

Preparation of Application Liquid for Second Intermediate Layer

Polyvinyl alcohol was dissolved in pure water to prepare a 10%-polyvinyl alcohol aqueous solution, and this was used as the application liquid for the second intermediate layer.

Application Liquid for First Thermosensitive Coloring Layer, Application Liquid for Second Thermosensitive Coloring Layer, and Application Liquid for First Intermediate Layer The same application liquid for the first thermosensitive coloring layer, application liquid for the second thermosensitive coloring layer, and application liquid for the first intermediate layer as those used in Example 19 were prepared.

Production of Thermosensitive Recording Medium

The application liquid for the third thermosensitive coloring layer was applied onto a 130 μm-thick synthetic paper (YUPO, manufactured by YUPO CORPORATION) such that the applied amount would be 11.25 g/m$^2$ after being dried, and was then dried to thereby form the third thermosensitive coloring layer. Then, the application liquid for the second intermediate layer was applied onto the formed third thermosensitive coloring layer such that the applied amount would be 11.25 g/m$^2$ after being dried, and was then dried to thereby form the second intermediate layer. Further, the application liquid for the second thermosensitive coloring layer was applied onto the formed second intermediate layer such that the applied amount would be 11.25 g/m$^2$ after being dried, and was then dried to thereby form the second thermosensitive coloring layer 20. Then, the application liquid for the first intermediate layer was applied onto the formed second thermosensitive coloring layer such that the applied amount would be 11.25 g/m$^2$ after being dried, and was then dried to thereby form the first intermediate layer 15. Further, the application liquid for the first thermosensitive coloring layer was applied onto the formed first intermediate layer such that the applied amount would be 11.25 g/m$^2$ after being dried, and was then dried to thereby form the first thermosensitive coloring layer. As a result, the thermosensitive recording medium was obtained.

Formation of Images

Images were formed using the same recording apparatus as the recording apparatus used in Example 1 (FIG. 2). Note that the temperature of the thermal head 106 was set such that the temperature of the image recording portion would be 170° C. 3 cm×3 cm solid images were formed in the thermosensitive recording medium under similar conditions to those in Example 1. As illustrated in FIG. 3, an image 202, image 203, and image 204 were formed in the thermosensitive recording medium 107 with the first thermosensitive coloring layer, second thermosensitive coloring layer, and third thermosensitive coloring layer, respectively.

Evaluation of Color Development Property and Color Turbidity

The optical reflection color densities of the formed images (the region 202, the region 203, and the region of the image 204 in FIG. 3) were measured using a reflection densitometer (trade name "Xrite 530", manufactured by Sakata Inx Engineering Co., Ltd.). The color development properties of and the suppression of color turbidity at the region 202 and the region 203 were equivalent to those in Example 19. Also, the optical reflection density of cyan (C) at the region of the image 204 (hereinafter referred to as "region 204") was high, and the region 204 colored significantly well. Moreover, color turbidity hardly occurred at the region 204 at the time of coloring to cyan.

Example 21

Preparation of Application Liquid for Protective Layer

The following materials were mixed and dissolved to thereby prepare the application liquid for the protective layer.

| | |
|---|---|
| 10% aqueous solution of acetoacetyl-modified polyvinyl alcohol (trade name: GOHSEFIMER Z-200, manufactured by The Nippon Synthetic Chemical Industry Co., Ltd.) | 350 parts |
| Amorphous silica (Mizukasil P-603, Mizusawa Industrial Chemicals, Ltd.) | 66 parts |
| 36%-aqueous dispersion of zinc stearate | 6 parts |

Preparation of Application Liquid for Protective Intermediate Layer

Tinuvin479-DW(N) (manufactured by BASF) was dispersed in pure water to thereby prepare a 10%-aqueous dispersion liquid, and this was used as the application liquid for the protective intermediate layer.

Production of Thermosensitive Recording Medium

The application liquid for the protective intermediate layer was applied onto the first thermosensitive coloring layer of the same thermosensitive recording medium as the thermosensitive recording medium produced in Example 20 such that the applied amount would be 11.25 $g/m^2$ after being dried, and was then dried to thereby form the protective intermediate layer. Further, the application liquid for the protective layer was applied onto the formed protective intermediate layer such that the applied amount would be 1 $g/m^2$ after being dried, and was then dried to thereby form the protective layer. As a result, the thermosensitive recording medium was obtained.

Formation of Images

As in Example 20, an image 202, image 203, and image 204 as illustrated in FIG. 3 were formed in the thermosensitive recording medium with the first thermosensitive coloring layer, second thermosensitive coloring layer, and third thermosensitive coloring layer, respectively.

Evaluation of Rub Fastness

Within three minutes after the image formation, OK Top Coat+ (manufactured by Oji Paper Co., Ltd., basis weight: 105 $g/m^2$) was laid over the images, and further a 500-g weight was placed thereon such that the area of contact would be 12.6 $cm^2$. Then, a rub fastness test was carried out in which the thermosensitive recording medium with the images formed therein and the OK Top Coat+ were rubbed against each other once at a relative speed of 10 cm/s. Thereafter, the dye attached to the OK Top Coat+ within the 12.6-$cm^2$ region on which the weight was placed was read with a scanner (multifunction peripheral iR3245F, manufactured by Canon Inc., 600 dpi, grayscale, photography mode). Then, the ratio of the area occupied by portions with a luminance of less than 128 in a 256-scale (dye attached area ratio) was calculated. As a result, the dye attached area ratio of the thermosensitive recording medium in Example 20 with no protective layer was 2% or more, whereas the dye attached area ratio of the thermosensitive recording medium in Example 20 with a protective layer was less than 2%.

Evaluation of Light Fastness

A light fastness test was carried out in which each formed image was irradiated with light for five hours using a sunshine long-life carbon arc lamp (255 $W/m^2$). Then, the optical reflection density of the image was measured. Thereafter, the difference from the optical reflection density of the image before the light fastness test was calculated. As a result, the optical reflection density of the thermosensitive recording medium in Example 20 with no protective intermediate layer decreased by approximately 0.5, whereas the optical reflection density of the thermosensitive recording medium in Example 21 with a protective intermediate layer did not decrease.

Evaluation of Color Development Property and Color Turbidity

As in Example 20, the optical reflection color densities of the formed images (region 202, region 203, and region 204 in FIG. 3) were measured. As a result, slight color turbidity with yellow occurred at the region 203 and the region 204. This is considered to be due to the fact that the transmittance of the protective intermediate layer 5 for UV rays with a wavelength of 365 nm was low and the first thermosensitive coloring layer was fixed somewhat insufficiently.

Example 22

A thermosensitive recording medium was obtained in a similar manner to Example 21 described above except that a 10%-aqueous dispersion liquid of Tinuvin 400 (manufactured by BASF) (with a transmittance of approximately 50% for 365-nm UV rays was used as the application liquid for the protective intermediate layer 5. Moreover, using the obtained thermosensitive recording medium, images were formed and subjected to various evaluations in similar manners to Example 21 described above. As a result, the optical reflection densities of the images did not decrease even after the light fastness test. Moreover, the color turbidity with yellow at the region 203 and the region 204 was improved. This is considered to be due to the fact that the transmittance of the protective intermediate layer for UV rays with a wavelength of 365 nm was raised and the first thermosensitive coloring layer was therefore fixed sufficiently.

Example 23

A thermosensitive recording medium was obtained in a similar manner to Example 22 described above except that UVECOAT9146 (manufactured by DAICEL-ALLNEX LTD.) was used as the radical-polymerizable compound. Moreover, using the obtained thermosensitive recording medium, images were formed and subjected to various evaluations in similar manners to Example 21 described above. As a result, the fixability of each thermosensitive coloring layer was improved, and the color turbidity was improved.

Example 24

A thermosensitive recording medium was obtained in a similar manner to Example 23 described above except that P1731 (manufactured by Tokyo Chemical Industry Co., Ltd.) was used as the electron-donating dye precursor. Moreover, using the obtained thermosensitive recording medium, images were formed and subjected to various evaluations in similar manners to Example 21 described above. As a result, a similar advantageous effect to Example 23 was obtained.

Example 25

A thermosensitive recording medium was obtained in a similar manner to Example 23 described above except that P2057 (manufactured by Tokyo Chemical Industry Co., Ltd.) was used as the electron-donating dye precursor. Moreover, using the obtained thermosensitive recording medium, images were formed and subjected to various evaluations in similar manners to Example 21 described above. As a result, a similar advantageous effect to Example 23 was obtained.

Comparative Example 1

A thermosensitive recording medium was obtained in a similar manner to Example 1 described above except that no electron-donating dye precursor was used. Moreover, an attempt was made to form images in a similar manner to Example 1 described above by using the obtained thermosensitive recording medium, but it did not color.

Comparative Example 2

A thermosensitive recording medium was obtained in a similar manner to Example 1 described above except that no electron-accepting compound was used. Moreover, an attempt was made to form images in a similar manner to Example 1 described above by using the obtained thermosensitive recording medium, but it did not color.

Comparative Example 3

A thermosensitive recording medium was obtained in a similar manner to Example 1 described above except that no radical-polymerizable compound was used. Moreover, using the obtained thermosensitive recording medium, images were formed and evaluated in similar manners to Example 1 described above. As a result, the first thermosensitive coloring layer was not fixed, so that color turbidity with yellow occurred at the time of coloring to magenta.

Comparative Example 4

A thermosensitive recording medium was obtained in a similar manner to Example 1 described above except that no photoradical polymerization initiator was used. Moreover, using the obtained thermosensitive recording medium, images were formed and evaluated in similar manners to Example 1 described above. As a result, the first thermosensitive coloring layer was not fixed, so that color turbidity with yellow occurred at the time of coloring to magenta.

Comparative Example 5

A thermosensitive recording medium was obtained in a similar manner to Example 1 described above except that no first intermediate layer was formed. Moreover, using the obtained thermosensitive recording medium, images were formed and evaluated in similar manners to Example 1 described above. As a result, the second thermosensitive coloring layer was also fixed when the first thermosensitive coloring layer 10 was fixed, so that magenta was not developed.

Comparative Example 6

A thermosensitive recording medium was obtained in a similar manner to Example 1 described above except that the first intermediate layer was formed using a 10%-solution of a polyvinyl alcohol having no UV absorbing function. Moreover, using the obtained thermosensitive recording medium, images were formed and evaluated in similar manners to Example 1 described above. As a result, the second thermosensitive coloring layer was also fixed when the first thermosensitive coloring layer was fixed, so that magenta was not developed.

Comparative Example 7

Instead of a radical-polymerizable compound and a photoradical polymerization initiator, 8 parts of a mixture of 1-methylpropylphenyl phenylmethane and 1-(1-methylpropylphenyl)-2-phenylethane, which was a high-boiling point solvent, was used. A thermosensitive recording medium was obtained in a similar manner to Example 1 described above except the above. As the above mixture, the trade name "Nisseki Hisol SAS-310 (manufactured by Nippon Petrochemical Co.) was used. Moreover, using the obtained thermosensitive recording medium, images were formed and evaluated in similar manners to Example 1 described above. As a result, the first thermosensitive coloring layer was not fixed, so that color turbidity with yellow occurred at the time of coloring to magenta.

Example 26

Images were formed and evaluated in similar manners to Example 23 described above except that the temperature of the thermal head 102 was set such that the temperature of the image recording portion would be 115° C. As a result, there was no difference in the color development property of the region 202 for yellow, but color turbidity with magenta was suppressed. Moreover, there was no difference in the color development property of the region 203 for magenta, but color turbidity with yellow was suppressed. It is considered that the heating temperature for the first thermosensitive coloring layer lower than that in Example 23 contributed to the suppression of color turbidity.

Example 27

Images were formed and evaluated in similar manners to Example 26 described above except that the temperature of the thermal head 102 was set such that the temperature of the image recording portion would be 145° C. As a result, the color development property of the region 202 for yellow was improved. However, slight color turbidity with magenta occurred at the region 202. This is considered to be due to the increase in the heating temperature for the first thermosensitive coloring layer.

Example 28

The temperature of the thermal head 102 was set such that the temperature of the image recording portion would be 130° C. Moreover, the temperature of the thermal head 104 was set such that the temperature of the image recording portion would be 146° C. Images were formed and evaluated in similar manners to Example 26 described above except the above. As a result, the color development property of the region 202 for yellow was equivalent to that in Example 27. On the other hand, color turbidity with magenta at the region 202 was suppressed. This is considered to be due to the decrease in the heating temperature for the first thermosensitive coloring layer. Note that although the heating temperature for the first thermosensitive coloring layer was somewhat lowered, it was not so lowered as to affect the coloring.

Example 29

Images were formed and evaluated in similar manners to Example 28 described above except that the temperature of the thermal head 104 was set such that the temperature of the image recording portion would be 165° C. As a result, the color development property of the region 202 for yellow and the suppression of color turbidity at the region 202 were equivalent to those in Example 28. Moreover, the color development property of the region 203 for magenta was somewhat improved, but slight color turbidity with cyan occurred. It is considered that the increase in the heating temperature for the second thermosensitive coloring layer also caused the third thermosensitive coloring layer to slightly color.

Example 30

The temperature of the thermal head 104 was set such that the temperature of the image recording portion would be 160° C. Also, the temperature of the thermal head 106 was set such that the temperature of the image recording portion would be 167° C. Images were formed and evaluated in similar manners to Example 29 described above except the above. As a result, the color development property of the region 202 for yellow and the suppression of color turbidity at the region 202 were equivalent to those in Example 29. Also, the color development property of the region 203 for magenta somewhat decreased, but color turbidity with cyan was suppressed. Moreover, the color development property of the region 204 for cyan somewhat decreased. This is considered to be due to the fact that the heating temperature for the third thermosensitive coloring layer was somewhat lowered.

Comparative Example 8

The temperature of the thermal head 102 was set such that the temperature of the image recording portion would be 115° C. Also, the temperature of the thermal head 104 was set such that the temperature of the image recording portion would be 160° C. Note that the thermal head 106 was not used. The duty of the pulse width of the voltage to be applied to each thermal head was set at approximately 50%. The wavelength of the UV light source 103 was 405 nm, and the wavelength of the UV light source 105 was 395 nm, and the UV light sources 103 and 105 were set to flash during the recording. Images were formed and evaluated in similar manners to Example 26 described above except the above. As a result, magenta was not developed at the region 203. This is considered to be due to the fact that the second thermosensitive coloring layer was also fixed when the first thermosensitive coloring layer was fixed since the wavelength of the UV light source 103 was 405 nm.

Comparative Example 9

The temperature of the thermal head 102 was set such that the temperature of the image recording portion would be 160° C. Also, the temperature of the thermal head 104 was set such that the temperature of the image recording portion would be 115° C. Note that the thermal head 106 was not used. The duty of the pulse width of the voltage to be applied to each thermal head was set at approximately 50%. The wavelength of the UV light source 103 was 395 nm, and the wavelength of the UV light source 105 was 405 nm, and the UV light sources 103 and 105 were set to flash during the recording. Images were formed and evaluated in similar manners to Example 26 described above except the above. As a result, color turbidity with magenta occurred at the region 202. Moreover, magenta was not developed at the region 203. This is considered to be caused by the heating temperature for the first thermosensitive coloring layer being so high that the second thermosensitive coloring layer colored at the same time and the heating temperature for the second thermosensitive coloring layer being so low that it did not color.

Comparative Example 10

Images were formed and evaluated in similar manners to Example 26 described above except that the UV light source 103 and the UV light source 105 were not used. As a result, color turbidity with yellow occurred at the region 203. This is considered to be due to the fact that the thermosensitive coloring layers were not fixed by UV irradiation.

Tables 1-1 to 1-4 and Tables 2-1 and 2-2 show a summary of the results of Examples and Comparative Examples described above. Also, Tables 3 to 7 show details of the components used in Examples and Comparative Exampled (the codes in Tables 1-1 to 1-4).

TABLE 1-1

Configurations of Thermosensitive Media and Image Forming Conditions

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Protective Layer | | No | No | No | No | No | No | No | No | No | No | No | No | No |
| Protective Intermediate Layer | UV absorber | — | — | — | — | — | — | — | — | — | — | — | — | — |
| First Thermosensitive Coloring Layer | Electron-Donating Dye Precursor | Y-1 | Y-1 | Y-1 | Y-1 | Y-1 | Y-1 | Y-1 | Y-1 | Y-1 | Y-1 | Y-1 | Y-1 | Y-1 |
| | Electron-accepting Compound | D-1 | D-1 | D-1 | D-1 | D-1 | D-1 | D-1 | D-1 | D-1 | D-1 | D-1 | D-1 | D-1 |
| | Radical-Polymerizable Compound | P-2 | P-2 | P-2 | P-2 | P-2 | P-2 | P-2 | P-2 | P-2 | P-2 | P-2 | P-2 | P-2 |
| | Photoradical Polymerization Initiator | I-1 | I-1 | I-1 | I-1 | I-1 | I-1 | I-2 | I-3 | I-4 | I-5 | I-6 | I-7 | I-8 |

TABLE 1-1-continued

| Configurations of Thermosensitive Media and Image Forming Conditions | | | | | | | | | | | | | | |
|---|---|---|---|---|---|---|---|---|---|---|---|---|---|---|
| | | Examples | | | | | | | | | | | | |
| | | 1 | 2 | 3 | 4 | 5 | 6 | 7 | 8 | 9 | 10 | 11 | 12 | 13 |
| First Intermediate Layer | UV absorber | U-3 | U-5 | U-7 | U-8 | U-9 | U-10 | U-7 | U-7 | U-7 | U-7 | U-7 | U-7 | U-7 |
| Second Thermo-sensitive Coloring Layer | Electron-Donating Dye Precursor | M | M | M | M | M | M | M | M | M | M | M | M | M |
| | Electron-accepting Compound | D-2 | D-2 | D-2 | D-2 | D-2 | D-2 | D-2 | D-2 | D-2 | D-2 | D-2 | D-2 | D-2 |
| | Radical-Polymerizable Compound | P-2 | P-2 | P-2 | P-2 | P-2 | P-2 | P-2 | P-2 | P-2 | P-2 | P-2 | P-2 | P-2 |
| | Photoradical Polymerization Initiator | I-1 | I-1 | I-1 | I-1 | I-1 | I-1 | I-2 | I-3 | I-4 | I-5 | I-6 | I-7 | I-8 |
| Second Inter-mediate Layer | UV absorber | — | — | — | — | — | — | — | — | — | — | — | — | — |
| Third Thermo-sensitive Coloring Layer | Electron-Donating Dye Precursor | — | — | — | — | — | — | — | — | — | — | — | — | — |
| | Electron-accepting Compound | — | — | — | — | — | — | — | — | — | — | — | — | — |
| Temperature of Thermal Head 102 (° C.) | | 130 | 130 | 130 | 130 | 130 | 130 | 130 | 130 | 130 | 130 | 130 | 130 | 130 |
| Wavelength of UV Light Source 103 (nm) | | 365 | 365 | 365 | 365 | 365 | 365 | 365 | 365 | 365 | 365 | 365 | 365 | 365 |
| Temperature of Thermal Head 104 (° C.) | | 160 | 160 | 160 | 160 | 160 | 160 | 160 | 160 | 160 | 160 | 160 | 160 | 160 |
| Wavelength of UV Light Source 105 (nm) | | 405 | 405 | 405 | 405 | 405 | 405 | 405 | 405 | 405 | 405 | 405 | 405 | 405 |
| Temperature of Thermal Head 106 (° C.) | | — | — | — | — | — | — | — | — | — | — | — | — | — |

TABLE 1-2

| Configurations of Thermosensitive Media and Image Forming Conditions | | | | | | | | | | | | | |
|---|---|---|---|---|---|---|---|---|---|---|---|---|---|
| | | Examples | | | | | | | | | | | |
| | | 14 | 15 | 16 | 17 | 18 | 19 | 20 | 21 | 22 | 23 | 24 | 25 |
| Protective Layer | | No | No | No | No | No | No | No | Yes | Yes | Yes | Yes | Yes |
| Protective Inter-mediate Layer | UV absorber | — | — | — | — | — | — | — | U-1 | U-12 | U-12 | U-12 | U-12 |
| First Thermo-sensitive Coloring Layer | Electron-Donating Dye Precursor | Y-1 | Y-1 | Y-1 | Y-1 | Y-1 | Y-1 | Y-1 | Y-1 | Y-1 | Y-1 | Y-2 | Y-3 |
| | Electron-accepting Compound | D-1 | D-1 | D-1 | D-1 | D-1 | D-1 | D-1 | D-1 | D-1 | D-1 | D-1 | D-1 |
| | Radical-Polymerizable Compound | P-2 | P-2 | P-2 | P-2 | P-2 | P-2 | P-2 | P-2 | P-2 | P-1 | P-1 | P-1 |
| | Photoradical Polymerization Initiator | I-9 | I-10 | I-11 | I-12 | I-2 | I-2 | I-2 | I-2 | I-2 | I-2 | I-2 | I-2 |
| First Intermediate Layer | UV absorber | U-7 | U-7 | U-7 | U-7 | U-6 | U-4 | U-4 | U-4 | U-4 | U-4 | U-4 | U-4 |
| Second Thermo-sensitive Coloring Layer | Electron-Donating Dye Precursor | M | M | M | M | M | M | M | M | M | M | M | M |
| | Electron-accepting Compound | D-2 | D-2 | D-2 | D-2 | D-2 | D-2 | D-2 | D-2 | D-2 | D-2 | D-2 | D-2 |

TABLE 1-2-continued

Configurations of Thermosensitive Media and Image Forming Conditions

| | | Examples | | | | | | | | | | | |
|---|---|---|---|---|---|---|---|---|---|---|---|---|---|
| | | 14 | 15 | 16 | 17 | 18 | 19 | 20 | 21 | 22 | 23 | 24 | 25 |
| | Radical-Polymerizable Compound | P-2 | P-2 | P-2 | P-2 | P-2 | P-2 | P-2 | P-2 | P-2 | P-1 | P-1 | P-1 |
| | Photoradical Polymerization Initiator | I-9 | I-10 | I-11 | I-12 | I-2 | I-2 | I-2 | I-2 | I-2 | I-2 | I-2 | I-2 |
| Second Inter-mediate Layer | UV absorber | — | — | — | — | — | — | U-11 | U-11 | U-11 | U-11 | U-11 | U-11 |
| Third Thermo-sensitive Coloring Layer | Electron-Donating Dye Precursor | — | — | — | — | — | — | C | C | C | C | C | C |
| | Electron-accepting Compound | — | — | — | — | — | — | D-3 | D-3 | D-3 | D-3 | D-3 | D-3 |
| Temperature of Thermal Head 102 (° C.) | | 130 | 130 | 130 | 130 | 130 | 130 | 130 | 130 | 130 | 130 | 130 | 130 |
| Wavelength of UV Light Source 103 (nm) | | 365 | 365 | 365 | 365 | 365 | 365 | 365 | 365 | 365 | 365 | 365 | 365 |
| Temperature of Thermal Head 104 (° C.) | | 160 | 160 | 160 | 160 | 160 | 160 | 160 | 160 | 160 | 160 | 160 | 160 |
| Wavelength of UV Light Source 105 (nm) | | 405 | 405 | 405 | 405 | 405 | 405 | 405 | 405 | 405 | 405 | 405 | 405 |
| Temperature of Thermal Head 106 (° C.) | | — | — | — | — | — | — | — | 170 | 170 | 170 | 170 | 170 |

TABLE 1-3

Configurations of Thermosensitive Media and Image Forming Conditions

| | | Comparative Examples | | | | | | |
|---|---|---|---|---|---|---|---|---|
| | | 1 | 2 | 3 | 4 | 5 | 6 | 7 |
| Protective Layer | | No | No | No | No | No | No | No |
| Protective Intermediate Layer | UV absorber | — | — | — | — | — | — | — |
| First Thermosensitive Coloring Layer | Electron-Donating Dye Precursor | — | Y-1 | Y-1 | Y-1 | Y-1 | Y-1 | Y-1 |
| | Electron-accepting Compound | D-1 | — | D-1 | D-1 | D-1 | D-1 | D-1 |
| | Radical-Polymerizable Compound | P-2 | P-2 | — | P-2 | P-2 | P-2 | P-3 |
| | Photoradical Polymerization Initiator | I-1 | I-1 | I-1 | — | I-1 | I-1 | — |
| First Intermediate Layer | UV absorber | U-2 | U-2 | U-2 | U-2 | | U-11 | U-2 |
| Second Thermosensitive Coloring Layer | Electron-Donating Dye Precursor | — | M | M | M | M | M | M |
| | Electron-accepting Compound | D-2 | — | D-2 | D-2 | D-2 | D-2 | D-2 |
| | Radical-Polymerizable Compound | P-2 | P-2 | — | P-2 | P-2 | P-2 | P-3 |
| | Photoradical Polymerization Initiator | I-1 | I-1 | I-1 | — | I-1 | I-1 | — |
| Second Intermediate Layer | UV absorber | — | — | — | — | — | — | — |
| Third Thermosensitive Coloring Layer | Electron-Donating Dye Precursor | — | — | — | — | — | — | — |
| | Electron-accepting Compound | — | — | — | — | — | — | — |
| Temperature of Thermal Head 102 (° C.) | | 130 | 130 | 130 | 130 | 130 | 130 | 130 |
| Wavelength of UV Light Source 103 (nm) | | 365 | 365 | 365 | 365 | 365 | 365 | 365 |
| Temperature of Thermal Head 104 (° C.) | | 160 | 160 | 160 | 160 | 160 | 160 | 160 |
| Wavelength of UV Light Source 105 (nm) | | 405 | 405 | 405 | 405 | 405 | 405 | 405 |
| Temperature of Thermal Head 106 (° C.) | | — | — | — | — | — | — | — |

TABLE 1-4

| Configurations of Thermosensitive Media and Image Forming Conditions | | | | | | | | | | |
|---|---|---|---|---|---|---|---|---|---|---|
| | | Examples | | | | | Comparative Examples | | |
| | | 26 | 27 | 28 | 29 | 30 | 8 | 9 | 10 |
| Protective Layer | | Yes | Yes | Yes | Yes | Yes | No | No | No |
| Protective Intermediate Layer | UV absorber | U-12 | U-12 | U-12 | U-12 | U-12 | — | — | — |
| First Thermosensitive Coloring Layer | Electron-Donating Dye Precursor | Y-1 | Y-1 | Y-1 | Y-1 | Y-1 | Y-1 | Y-1 | Y-1 |
| | Electron-accepting Compound | D-1 | D-1 | D-1 | D-1 | D-1 | D-1 | D-1 | D-1 |
| | Radical-Polymerizable Compound | P-1 | P-1 | P-1 | P-1 | P-1 | P-1 | P-1 | P-1 |
| | Photoradical Polymerization Initiator | I-2 | I-2 | I-2 | I-2 | I-2 | I-2 | I-2 | I-2 |
| First Intermediate Layer | UV absorber | U-4 | U-4 | U-4 | U-4 | U-4 | U-2 | U-2 | U-2 |
| Second Thermosensitive Coloring Layer | Electron-Donating Dye Precursor | M | M | M | M | M | M | M | M |
| | Electron-accepting Compound | D-2 | D-2 | D-2 | D-2 | D-2 | D-2 | D-2 | D-2 |
| | Radical-Polymerizable Compound | P-1 | P-1 | P-1 | P-1 | P-1 | P-1 | P-1 | P-1 |
| | Photoradical Polymerization Initiator | I-2 | I-2 | I-2 | I-2 | I-2 | I-2 | I-2 | I-2 |
| Second Intermediate Layer | UV absorber | U-11 | U-11 | U-11 | U-11 | U-11 | — | — | — |
| Third Thermosensitive Coloring Layer | Electron-Donating Dye Precursor | C | C | C | C | C | — | — | — |
| | Electron-accepting Compound | D-3 | D-3 | D-3 | D-3 | D-3 | — | — | — |
| Temperature of Thermal Head 102 (° C.) | | 115 | 145 | 130 | 130 | 130 | 115 | 160 | 115 |
| Wavelength of UV Light Source 103 (nm) | | 365 | 365 | 365 | 365 | 365 | 405 | 395 | — |
| Temperature of Thermal Head 104 (° C.) | | 160 | 160 | 146 | 165 | 160 | 160 | 115 | 160 |
| Wavelength of UV Light Source 105 (nm) | | 405 | 405 | 405 | 405 | 405 | 395 | 405 | — |
| Temperature of Thermal Head 106 (° C.) | | 170 | 170 | 170 | 170 | 167 | — | — | — |

TABLE 2-1

| Evaluation Results | | | | | | | | | | |
|---|---|---|---|---|---|---|---|---|---|---|
| | | Color Development Property | Color Turbidity | | Color Development Property | Color Turbidity | | Color Development Property | Color Turbidity | |
| | | Optical Reflection Density*1 | Optical Reflection Density*2 | Optical Reflection Density*3 | Optical Reflection Density*4 | Optical Reflection Density*5 | Optical Reflection Density*6 | Optical Reflection Density*7 | Optical Reflection Density*8 | Optical Reflection Density*9 |
| Examples | 1 | 1.49 | 0.12 | — | 1.10 | 0.50 | — | — | — | — |
| | 2 | 1.50 | 0.10 | — | 1.23 | 0.53 | — | — | — | — |
| | 3 | 1.51 | 0.08 | — | 1.35 | 0.52 | — | — | — | — |
| | 4 | 1.49 | 0.09 | — | 1.38 | 0.52 | — | — | — | — |
| | 5 | 1.52 | 0.12 | — | 1.37 | 0.52 | — | — | — | — |
| | 6 | 1.50 | 0.09 | — | 1.36 | 0.52 | — | — | — | — |
| | 7 | 1.52 | 0.08 | — | 1.34 | 0.32 | — | — | — | — |
| | 8 | 1.48 | 0.11 | — | 1.34 | 0.32 | — | — | — | — |
| | 9 | 1.51 | 0.12 | — | 1.35 | 0.30 | — | — | — | — |
| | 10 | 1.48 | 0.11 | — | 1.36 | 0.33 | — | — | — | — |
| | 11 | 1.49 | 0.08 | — | 1.34 | 0.31 | — | — | — | — |
| | 12 | 1.50 | 0.09 | — | 1.37 | 0.32 | — | — | — | — |
| | 13 | 1.49 | 0.08 | — | 1.35 | 0.30 | — | — | — | — |
| | 14 | 1.50 | 0.10 | — | 1.35 | 0.29 | — | — | — | — |
| | 15 | 1.50 | 0.10 | — | 1.36 | 0.31 | — | — | — | — |
| | 16 | 1.49 | 0.11 | — | 1.35 | 0.31 | — | — | — | — |
| | 17 | 1.48 | 0.10 | — | 1.34 | 0.31 | — | — | — | — |
| | 18 | 1.51 | 0.08 | — | 1.48 | 0.33 | — | — | — | — |
| | 19 | 1.50 | 0.10 | — | 1.48 | 0.33 | — | — | — | — |
| | 20 | 1.48 | 0.10 | 0.09 | 1.51 | 0.33 | 0.09 | 1.50 | 0.15 | 0.10 |

TABLE 2-1-continued

| | Evaluation Results | | | | | | | | |
|---|---|---|---|---|---|---|---|---|---|
| | Color Development Property | Color Turbidity | | Color Development Property | Color Turbidity | | Color Development Property | Color Turbidity | |
| | Optical Reflection Density*1 | Optical Reflection Density*2 | Optical Reflection Density*3 | Optical Reflection Density*4 | Optical Reflection Density*5 | Optical Reflection Density*6 | Optical Reflection Density*7 | Optical Reflection Density*8 | Optical Reflection Density*9 |
| 21 | 1.51 | 0.09 | 0.08 | 1.48 | 0.40 | 0.08 | 1.48 | 0.22 | 0.08 |
| 22 | 1.49 | 0.08 | 0.09 | 1.52 | 0.30 | 0.12 | 1.51 | 0.15 | 0.10 |
| 23 | 1.50 | 0.09 | 0.11 | 1.51 | 0.11 | 0.12 | 1.52 | 0.12 | 0.10 |
| 24 | 1.50 | 0.11 | 0.12 | 1.48 | 0.08 | 0.09 | 1.50 | 0.10 | 0.09 |
| 25 | 1.48 | 0.09 | 0.09 | 1.48 | 0.12 | 0.10 | 1.50 | 0.09 | 0.09 |

*1optical reflection density of Y at region 202 (FIG. 3)
*2optical reflection density of M at region 202 (FIG. 3)
*3optical reflection density of C at region 202 (FIG. 3)
*4optical reflection density of M at region 203 (FIG. 3)
*5optical reflection density of Y at region 203 (FIG. 3)
*6optical reflection density of C at region 203 (FIG. 3)
*7optical reflection density of C at region 204 (FIG. 3)
*8optical reflection density of Y at region 204 (FIG. 3)
*9optical reflection density of M at region 204 (FIG. 3)

TABLE 2-2

| | | Evaluation Results | | | | | | | | |
|---|---|---|---|---|---|---|---|---|---|---|
| | | Color Development Property | Color Turbidity | | Color Development Property | Color Turbidity | | Color Development Property | Color Turbidity | |
| | | Optical Reflection Density*1 | Optical Reflection Density*2 | Optical Reflection Density*3 | Optical Reflection Density*4 | Optical Reflection Density*5 | Optical Reflection Density*6 | Optical Reflection Density*7 | Optical Reflection Density*8 | Optical Reflection Density*9 |
| Comparative | 1 | 0.10 | 0.11 | — | 0.12 | 0.12 | — | — | — | — |
| Examples | 2 | 0.12 | 0.10 | — | 0.08 | 0.09 | — | — | — | — |
| | 3 | 1.50 | 0.08 | — | 1.48 | 1.49 | — | — | — | — |
| | 4 | 1.48 | 0.09 | — | 1.51 | 1.52 | — | — | — | — |
| | 5 | 1.51 | 0.11 | — | 0.08 | 0.09 | — | — | — | — |
| | 6 | 1.51 | 0.08 | — | 0.12 | 0.11 | — | — | — | — |
| | 7 | 1.52 | 0.08 | — | 1.52 | 1.49 | — | — | — | — |
| Examples | 26 | 1.34 | 0.08 | 0.09 | 1.37 | 0.09 | 0.10 | 1.49 | 0.09 | 0.09 |
| | 27 | 1.52 | 0.50 | 0.08 | 1.37 | 0.12 | 0.08 | 1.50 | 0.11 | 0.08 |
| | 28 | 1.49 | 0.11 | 0.09 | 1.35 | 0.11 | 0.09 | 1.50 | 0.08 | 0.12 |
| | 29 | 1.48 | 0.12 | 0.12 | 1.52 | 0.10 | 0.54 | 1.48 | 0.12 | 0.09 |
| | 30 | 1.49 | 0.12 | 0.11 | 1.49 | 0.09 | 0.09 | 1.41 | 0.12 | 0.12 |
| Comparative | 8 | 1.35 | 0.08 | — | 0.10 | 0.09 | — | — | — | — |
| Examples | 9 | 1.49 | 1.52 | — | 0.09 | 0.10 | — | — | — | — |
| | 10 | 1.38 | 0.11 | — | 1.52 | 1.50 | — | — | — | — |

*1optical reflection density of Y at region 202 (FIG. 3)
*2optical reflection density of M at region 202 (FIG. 3)
*3optical reflection density of C at region 202 (FIG. 3)
*4optical reflection density of M at region 203 (FIG. 3)
*5optical reflection density of Y at region 203 (FIG. 3)
*6optical reflection density of C at region 203 (FIG. 3)
*7optical reflection density of C at region 204 (FIG. 3)
*8optical reflection density of Y at region 204 (FIG. 3)
*9optical reflection density of M at region 204 (FIG. 3)

TABLE 3

| Kinds of Electron-Donating Dye Precursors | | | |
|---|---|---|---|
| | Product Name | Manufacturer | Melting Point (° C.) |
| C | GN-2 | Yamamoto Chemicals Inc. | 170 |
| M | RED-40 | Yamamoto Chemicals Inc. | 158 |
| Y-1 | YELLOW435 | Fukui Yamada Chemical Co., Ltd. | 90-100 |
| Y-2 | P1731 | Tokyo Chemical Industry Co., Ltd. | 96 |
| Y-3 | P2057 | Tokyo Chemical Industry Co., Ltd. | 83 |

TABLE 4

| Kinds of Electron-accepting Compounds | | | |
|---|---|---|---|
| | Product Name | Manufacturer | Melting Point (° C.) |
| D-1 | D-8 | Nippon Soda Co., Ltd. | 128-130 |
| D-2 | D-90 | Nippon Soda Co., Ltd. | 117-150 |
| D-3 | TGSH(H) | Nippon Kayaku Co., Ltd. | 149-155 |

TABLE 5

| Kinds of Radical-Polymerizable Compounds | | |
|---|---|---|
| | Product Name | Manufacturer |
| P-1 | UVECOAT9146 | DAICEL-ALLNEX LTD. |
| P-2 | SR355 | Arkema |
| P-3 | Mixture of 1-methylpropylphenyl phenylmethane and 1-(1-methylpropylphenyl)-2-phenylethane | — |

TABLE 6

| Kinds of Photoradical Polymerization Initiators | |
|---|---|
| | Material Name |
| I-1 | Trade Name “Omnirad 184” (manufactured by iGM Resin) |
| I-2 | Diphenyl(2,4,6-trimethylbenzoyl)phosphine oxide |
| I-3 | Phenylbis(2,4,6-trimethylbenzoyl)phosphine oxide |
| I-4 | 2-chlorothioxanthone |
| I-5 | 2,4-diethylthioxanthone |
| I-6 | Isopropylthioxanthone |
| I-7 | 4-phenylbenzophenone |
| I-8 | 4-(4-methylphenylthio)benzophenone |
| I-9 | 4,4'-bis(diethylamino)benzophenone |
| I-10 | 2-(dimethylamino)-2-[(4-methylphenyl)methyl]-1-[4-(4-morpholinyl)phenyl]-1-butanone |
| I-11 | 2-benzyl-2-dimethylamino-1-(4-morpholinophenyl)-butanone-1 |
| I-12 | 2-methyl-1-[4-(methylthio)phenyl]-2-morpholinopropane-1-one |

TABLE 7

| Kinds of UV Absorbers | | | | |
|---|---|---|---|---|
| | Product Name | Content (parts) | 365-nm Transmittance (%) | 405-nm Transmittance (%) |
| U-1 | Tinuvin 479-DW(N) | 10 | 8 | 98 |
| U-3 | 2-oxyphenylbenzotriazole diphenylphosphinate | 5 | >5 | |
| U-4 | Tinuvin 460 | 10 | 0 | 96 |
| U-5 | 2-oxyphenylbenzotriazole diphenylphosphinate | 20 | ≤5 | ≥20 |

TABLE 7-continued

| Kinds of UV Absorbers | | | | |
|---|---|---|---|---|
| | Product Name | Content (parts) | 365-nm Transmittance (%) | 405-nm Transmittance (%) |
| U-6 | Tinuvin PS | 10 | ≤5 | ≥20 |
| U-7 | UVA-935LH | 10 | 4 | 98 |
| U-8 | Methyl salicylate | 10 | ≤5 | ≥20 |
| U-9 | Uvinul 3035 | 10 | ≤5 | ≥20 |
| U-10 | Rutile titanium oxide | 10 | ≤5 | ≥20 |
| U-11 | Polyvinyl alcohol | 10 | 100 | 100 |
| U-12 | Tinuvin 400 | 10 | 50 | 100 |

According to the present invention, it is possible to provide a thermosensitive recording medium that has two or more thermosensitive coloring layers but can still suppress the occurrence of color turbidity and form an image with a good color development property. Moreover, according to the present invention, it is possible to provide an image forming method using the above thermosensitive recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A thermosensitive recording medium including a support and a first thermosensitive coloring layer, a first intermediate layer, and a second thermosensitive coloring layer disposed on the support in descending order of distance from the support, wherein the first thermosensitive coloring layer and the second thermosensitive coloring layer each contain an electron-donating dye precursor, an electron-accepting compound, a radical-polymerizable compound, and a photoradical polymerization initiator, and the first intermediate layer contains a UV absorber, which is at least one selected from the group consisting of compounds represented by general formulas (1) to (5) and titanium oxide:

(1)

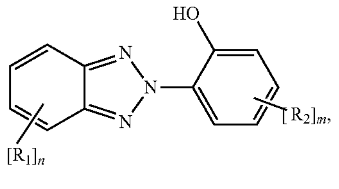

wherein $R_1$ represents a substituted or unsubstituted alkyl group having 1 to 8 carbon atoms, a substituted or unsubstituted alkoxy group having 1 to 8 carbon atoms, or a halogen atom, n represents an integer of 0 to 4, $R_2$ represents a substituted or unsubstituted alkyl group having 1 to 8 carbon atoms, a substituted or unsubstituted aralkyl group having 7 to 12 carbon atoms, or a substituted or unsubstituted alkylene group having 1 to 8 carbon atoms, m represents an integer of 0 to 4, and when $R_2$ is the substituted or unsubstituted alkylene group having 1 to 8 carbon atoms, a plurality of (2-hydroxy-phenyl)-benzotriazole structures are bonded via the alkylene group;

(2)

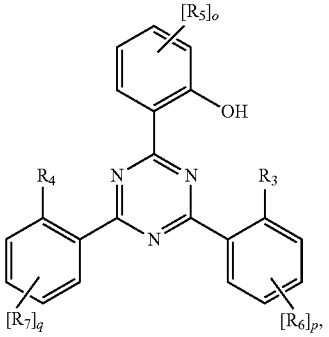

wherein $R_3$ and $R_4$ each independently represent a hydrogen atom, a methyl group, or a hydroxyl group, $R_5$, $R_6$, and $R_7$ each independently represent a substituted or unsubstituted alkyl group having 1 to 8 carbon atoms or a substituted or unsubstituted alkoxy group having 1 to 8 carbon atoms, and o, p, and q each independently represent an integer of 0 to 4;

(3)

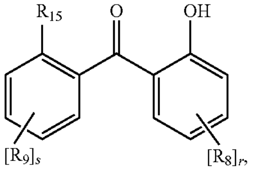

wherein $R_{15}$ represents a hydrogen atom, a methyl group, or a hydroxyl group, $R_8$ represents a substituted or unsubstituted alkyl group having 1 to 8 carbon atoms, a substituted or unsubstituted aryl group having 6 to 12 carbon atoms, a substituted or unsubstituted alkoxy group having 1 to 8 carbon atoms, a substituted or unsubstituted aralkyl group having 7 to 12 carbon atoms, or a substituted or unsubstituted alkylene group having 1 to 8 carbon atoms, r represents an integer of 0 to 4, when $R_8$ is the substituted or unsubstituted alkylene group having 1 to 8 carbon atoms, a plurality of 2-hydroxy-benzophenone structures are bonded via the alkylene group, $R_9$ represents a substituted or unsubstituted alkyl group having 1 to 8 carbon atoms, a substituted or unsubstituted aryl group having 6 to 12 carbon atoms, a substituted or unsubstituted alkoxy group having 1 to 8 carbon atoms, or a substituted or unsubstituted aralkyl group having 7 to 12 carbon atoms, and s represents an integer of 0 to 4;

(4)

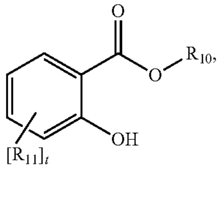

wherein $R_{10}$ represents a substituted or unsubstituted alkyl group having 1 to 18 carbon atoms, a substituted or unsubstituted aryl group having 6 to 12 carbon atoms, or a substituted or unsubstituted aralkyl group having 7 to 12 carbon atoms, $R_{11}$ represents a substituted or unsubstituted alkyl group having 1 to 8 carbon atoms, a substituted or unsubstituted aryl group having 6 to 12 carbon atoms, a substituted or unsubstituted alkoxy group having 1 to 8 carbon atoms, or a substituted or unsubstituted aralkyl group having 7 to 12 carbon atoms, and t represents an integer of 0 to 4; and (5)

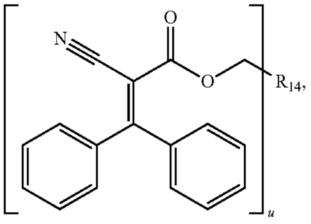

wherein u represents an integer of 1 to 4, when u is 1, $R_{14}$ represents a substituted or unsubstituted alkyl group having 1 to 8 carbon atoms or a substituted or unsubstituted aralkyl group having 7 to 12 carbon atoms, and when u is 2 to 4, $R_{14}$ represents a linking group having a valence of u, and wherein the thermosensitive recording medium is such that an optical reflection density of an image formed in the thermosensitive recording medium with the second thermosensitive coloring layer is 1.34 or more, when the image is formed by an image forming method comprising:

a step (a) of heating the thermosensitive recording medium at 130° C. to thereby cause the first thermosensitive coloring layer to color;

a step (b) of irradiating the first thermosensitive coloring layer colored by the step (a) with a first UV ray having a wavelength of 365 nm to thereby polymerize the radical-polymerizable compound in the first thermosensitive coloring layer;

a step (c) heating the thermosensitive recording medium irradiated with the first UV ray at 160° C. to thereby cause the second thermosensitive coloring layer to color; and a step (d) irradiating the second thermosensitive coloring layer colored by the step (c) with a second UV ray having a wavelength of 405 nm to thereby polymerize the radical-polymerizable compound in the second thermosensitive coloring layer.

2. The thermosensitive recording medium according to claim 1, wherein a transmittance of the first intermediate layer for light with a wavelength of 365 nm is smaller than a transmittance of the first intermediate layer for light with a wavelength of 405 nm.

3. The thermosensitive recording medium according to claim 1, wherein a transmittance of the first intermediate layer for light with a wavelength of 365 nm is 5% or less, and a transmittance of the first intermediate layer for light with a wavelength of 405 nm is 20% or more.

4. The thermosensitive recording medium according to claim 1, wherein the photoradical polymerization initiator is at least one selected from the group consisting of diphenyl (2,4,6-trimethylbenzoyl) phosphine oxide, phenylbis(2,4,6-trimethylbenzoyl) phosphine oxide, 2-chlorothioxanthone, 2,4-diethylthioxanthone, isopropylthioxanthone, 4-phenylbenzophenone, 4-(4-methylphenylthio)benzophenone, 4,4'- bis(diethylamino)benzophenone, 2-(dimethylamino)-2-[(4-methylphenyl)methyl]-1-[4-(4-morpholinyl)phenyl]-1-butanone, 2-benzyl-2-dimethylamino-1-(4-morpholinophenyl)-butanone-1, and 2-methyl-1-[4-(methylthio)phenyl]-2-morpholinopropane-1-one.

5. The thermosensitive recording medium according to claim 1, wherein the UV absorber contains at least one selected from the group consisting of the compound represented by the general formula (1) and the compound represented by the general formula (2).

6. The thermosensitive recording medium according to claim 1, further comprising a second intermediate layer and a third thermosensitive coloring layer disposed between the second thermosensitive coloring layer and the support in descending order of distance from the support.

7. The thermosensitive recording medium according to claim 1, further comprising a protective layer and a protective intermediate layer disposed on the first thermosensitive coloring layer.

8. The thermosensitive recording medium according to claim 7, wherein a transmittance of the protective intermediate layer for light with a wavelength of 365 nm is 10% or more.

9. The thermosensitive recording medium according to claim 1, wherein the radical-polymerizable compound is a compound that is solid at 25° C.

10. An image forming method comprising:

a step (a) of heating the thermosensitive recording medium according to claim 1 to thereby cause the first thermosensitive coloring layer to color;

a step (b) of irradiating the first thermosensitive coloring layer colored by the step (a) with a first UV ray to thereby polymerize the radical-polymerizable compound in the first thermosensitive coloring layer;

a step (c) of heating the thermosensitive recording medium irradiated with the first UV ray at a temperature higher than a heating temperature for the thermosensitive recording medium in the step (a) to thereby cause the second thermosensitive coloring layer to color; and a step (d) of irradiating the second thermosensitive coloring layer colored by the step (c) with a second UV ray having a longer wavelength than that of the first UV ray to thereby polymerize the radical-polymerizable compound in the second thermosensitive coloring layer.

11. The image forming method according to claim 10, wherein the wavelength of the second UV ray to be applied to the second thermosensitive coloring layer is longer than the wavelength of the first UV ray to be applied to the first thermosensitive coloring layer by 20 nm or more.

12. The image forming method according to claim 10, wherein a transmittance of the first intermediate layer for the first UV ray to be applied to the first thermosensitive coloring layer is 5% or less, and a transmittance of the first intermediate layer for the second UV ray to be applied to the second thermosensitive coloring layer is 20% or more.

13. The image forming method according to claim 10, wherein:

the wavelength of the first UV ray is 345 nm to 385 nm; and the wavelength of the second UV ray is more than 385 nm to 425 nm.

14. The image forming method according to claim 10, wherein:

the heating temperature for the thermosensitive recording medium in the step (a) is 120° C. to 140° C.; and the heating temperature for the thermosensitive recording medium in the step (c) is 150° C. to less than 170° C.

15. The image forming method according to claim 10, wherein:

the thermosensitive recording medium comprises a second intermediate layer and a third thermosensitive coloring layer disposed between the second thermosensitive coloring layer and the support in descending order of distance from the support; and the image forming method further comprises a step (e) of heating the thermosensitive recording medium irradiated with the UV irradiation in the step (d) to thereby cause the third thermosensitive coloring layer to color.

16. The image forming method according to claim 15, wherein a heating temperature for the thermosensitive recording medium in the step (e) is higher than the heating temperature for the thermosensitive recording medium in the step (c).

17. The image forming method according to claim 15, wherein a heating temperature for the thermosensitive recording medium in the step (e) is 165° C. or more.

18. The thermosensitive recording medium according to claim 1, wherein the UV absorber is the compound represented by the general formula (2).

* * * * *